United States Patent
Kim et al.

(10) Patent No.: US 9,826,268 B2
(45) Date of Patent: *Nov. 21, 2017

(54) DISPLAY APPARATUS FOR PROVIDING ENHANCED ELECTRONIC PROGRAM GUIDE AND METHOD OF CONTROLLING THE SAME

(71) Applicant: LG ELECTRONICS INC., Seoul (KR)

(72) Inventors: Ryoung Kim, Pyeongtaek-si (KR); Yujin Bae, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/004,090

(22) Filed: Jan. 22, 2016

(65) Prior Publication Data

US 2016/0198213 A1    Jul. 7, 2016

Related U.S. Application Data

(63) Continuation of application No. 13/290,327, filed on Nov. 7, 2011, now Pat. No. 9,277,163.

(30) Foreign Application Priority Data

May 4, 2011  (KR) .................. 10-2011-0042275

(51) Int. Cl.
*H04N 5/445*   (2011.01)
*H04N 21/431*  (2011.01)
(Continued)

(52) U.S. Cl.
CPC .......... *H04N 21/4312* (2013.01); *H04N 5/76* (2013.01); *H04N 21/262* (2013.01);
(Continued)

(58) Field of Classification Search
CPC .................................................. H04N 21/482
(Continued)

(56) References Cited

U.S. PATENT DOCUMENTS 6,483,548 B1    11/2002  Allport
6,631,523 B1 *  10/2003  Matthews, III .... H04N 5/44543
                                                                    348/E5.105
(Continued)

FOREIGN PATENT DOCUMENTS

CN    1812555 A    8/2006
EP    193712 A2    4/2002
(Continued)

*Primary Examiner* — Michael B Pierorazio
(74) *Attorney, Agent, or Firm* — Birch, Stewart, Kolasch & Birch, LLP

(57) ABSTRACT

A network device can include a tuner configured to receive audio and video data of at least one broadcast program, a network interface configured to receive at least one thumbnail image corresponding the at least one broadcast program, a user interface configured to receive a first command for executing an electronic program guide from a remote controller, and a controller configured to output a signal for displaying the electronic program guide in response to the first command. Also, the electronic program guide can include the at least one thumbnail image within a designated time zone.

16 Claims, 20 Drawing Sheets

| ACTUAL TIME TABLE | |
|---|---|
| 9:00 ~ 9:40 | 9 O'CLOCK NEWS |
| 9:50 ~ 10:45 | DRAMA |
| 10:50 ~ 10:58 | SPORTS NEWS |
| 11:00 ~ 11:10 | LEANING ENGLISH |
| 11:20 ~ 1:40 | MOVIE |

| TIME ZONE | REPRESENTATIVE THUMBNAIL IMAGE | |
|---|---|---|
| 9:00 ~ 10:00 |  | 9 O'CLOCK NEWS |
| 10:00 ~ 11:00 |  | DRAMA |
| 11:00 ~ 12:00 |  | MOVIE |
| 12:00 ~ 1:00 |  | MOVIE |
| 1:00 ~ 2:00 |  | MOVIE |

(51) Int. Cl.

| | |
|---|---|
| *H04N 5/76* | (2006.01) |
| *H04N 21/422* | (2011.01) |
| *H04N 21/462* | (2011.01) |
| *H04N 21/482* | (2011.01) |
| *H04N 21/262* | (2011.01) |
| *H04N 21/426* | (2011.01) |
| *H04N 21/434* | (2011.01) |
| *H04N 21/458* | (2011.01) |
| *H04N 21/488* | (2011.01) |
| *H04N 21/84* | (2011.01) |
| *H04N 5/775* | (2006.01) |
| *H04N 9/82* | (2006.01) |

(52) U.S. Cl.
CPC ... *H04N 21/4263* (2013.01); *H04N 21/42204* (2013.01); *H04N 21/42222* (2013.01); *H04N 21/4314* (2013.01); *H04N 21/4345* (2013.01); *H04N 21/458* (2013.01); *H04N 21/4622* (2013.01); *H04N 21/4821* (2013.01); *H04N 21/4882* (2013.01); *H04N 21/84* (2013.01); *H04N 5/775* (2013.01); *H04N 9/8227* (2013.01)

(58) Field of Classification Search
USPC .................................... 725/41, 49
See application file for complete search history.

(56) References Cited

U.S. PATENT DOCUMENTS

| | | | |
|---|---|---|---|
| 7,150,031 B1 | 12/2006 | Rodriguez et al. | |
| 7,155,733 B2 | 12/2006 | Rodriguez et al. | |
| 7,366,918 B2 | 4/2008 | Barlow et al. | |
| 7,380,260 B1* | 5/2008 | Billmaier | G06F 3/0482 |
| | | | 348/E5.103 |
| 7,665,109 B2 | 2/2010 | Matthews, III et al. | |
| 8,005,826 B1 | 8/2011 | Sahami et al. | |
| 8,458,745 B2 | 6/2013 | Shanks et al. | |
| 8,479,232 B2 | 7/2013 | Kim et al. | |
| 8,832,738 B2 | 9/2014 | Shanks et al. | |
| 8,850,477 B2 | 9/2014 | Schein et al. | |
| 9,071,372 B2 | 6/2015 | Sekiguchi | |
| 2002/0035727 A1* | 3/2002 | Numata | H04N 5/44543 |
| | | | 725/44 |
| 2004/0139465 A1 | 7/2004 | Matthews, III et al. | |
| 2004/0163117 A1 | 8/2004 | Rodriguez et al. | |
| 2005/0048916 A1 | 3/2005 | Suh | |
| 2005/0251825 A1* | 11/2005 | Fukuda | H04N 5/44543 |
| | | | 725/44 |
| 2005/0251852 A1 | 11/2005 | Patrick et al. | |
| 2006/0064716 A1* | 3/2006 | Sull | G06F 17/30793 |
| | | | 725/37 |
| 2006/0143652 A1 | 6/2006 | Chung | |
| 2006/0271964 A1 | 11/2006 | Rodriguez et al. | |
| 2007/0011702 A1* | 1/2007 | Vaysman | H04N 21/84 |
| | | | 725/45 |
| 2007/0094690 A1 | 4/2007 | Rodriguez et al. | |
| 2007/0212025 A1 | 9/2007 | Barton et al. | |
| 2008/0235738 A1* | 9/2008 | Lee | H04N 5/44543 |
| | | | 725/56 |
| 2008/0271080 A1 | 10/2008 | Gossweiler et al. | |
| 2009/0148133 A1 | 6/2009 | Nomura et al. | |
| 2009/0150379 A1 | 6/2009 | Park et al. | |
| 2009/0165052 A1* | 6/2009 | Lee | H04N 5/44543 |
| | | | 725/40 |
| 2009/0322962 A1* | 12/2009 | Weeks | H04N 7/17318 |
| | | | 348/726 |
| 2010/0083316 A1* | 4/2010 | Togashi | H04N 5/44543 |
| | | | 725/41 |
| 2010/0180298 A1* | 7/2010 | Kim | H04N 5/4403 |
| | | | 725/39 |
| 2010/0180306 A1* | 7/2010 | Kim | H04N 5/44543 |
| | | | 725/47 |
| 2010/0275233 A1* | 10/2010 | Soohoo | H04N 5/44543 |
| | | | 725/46 |
| 2011/0072463 A1 | 3/2011 | Zaslavsky et al. | |
| 2011/0099579 A1 | 4/2011 | Kim et al. | |
| 2011/0202960 A1 | 8/2011 | Vaysman et al. | |

FOREIGN PATENT DOCUMENTS

| | | |
|---|---|---|
| EP | 1193712 A2 | 4/2002 |
| EP | 2091243 A2 | 8/2009 |
| EP | 2 209 309 A1 | 7/2010 |
| KR | 10-2009-0059923 A | 6/2009 |
| WO | WO 98/21877 A2 | 5/1998 |
| WO | WO 99/01984 A1 | 1/1999 |
| WO | WO 2006/081577 A2 | 8/2006 |

\* cited by examiner

FIG. 3

| Syntax | No. of Bits | Format |
|---|---|---|
| event_information_table_section () { | | |
|     table_id | 8 | OXCB |
|     section_syntax_indicator | 1 | '1' |
|     private_indicator | 1 | '1' |
|     reserved | 2 | '11' |
|     section_length | 12 | uimsbf |
|     source_id | 16 | uimsbf |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     number_events_in_section | 8 | uimsbf |
|     for (j = 0; j<num_events_in_section;j++) { | | |
|         reserved | 2 | '11' |
|         event_id | 14 | uimsbf |
|         start_time | 32 | uimsbf |
|         reserved | 2 | '11' |
|         ETM_location | 2 | uimsbf |
|         length_in_seconds | 20 | uimsbf |
|         title_length | 8 | uimsbf |
|         title_text() | var | |
|         reserved | 4 | '1111' |
|         descriptors_length | 12 | |
|         for (i = 0; i<N;i++) { | | |
|             descriptor() | | |
|         } | | |
|     } | | |
|     CRC_32 | 32 | rpchof |
| } | | |

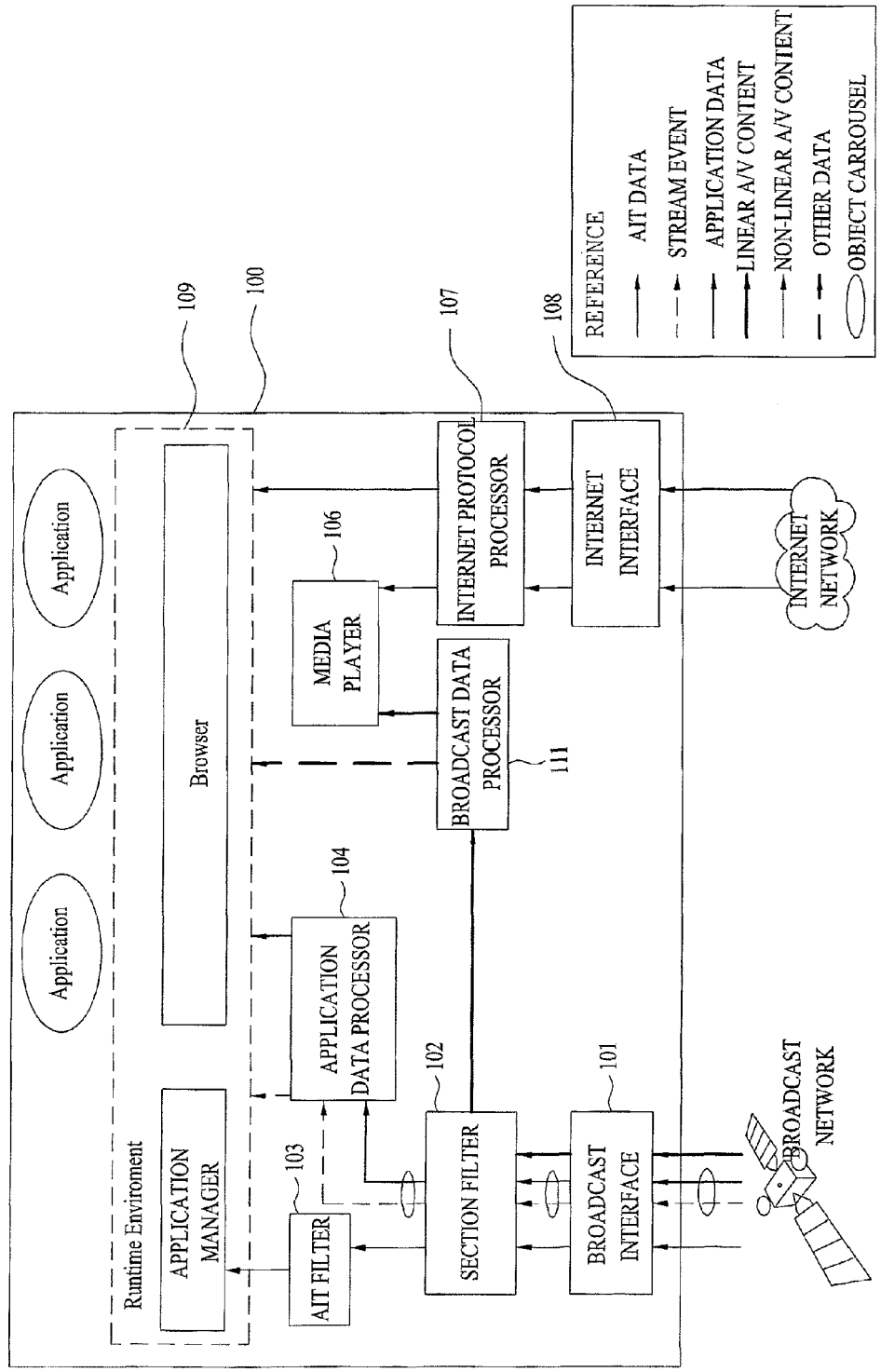

FIG. 8(a)

| CHANNEL | 9:00 | 9:30 | 10:00 |
|---|---|---|---|
| | ◀ OCTOBER 12, 2010 ▶ | | |
| MBS | EPISODE 27 OF INFINITE CHALLENGE | SPORTS NEWS | TERMINATOR |
| KBC | EPISODE 3 OF GHOST | EPISODE 11 OF LOST | |
| SBT | BASEBALL | | SOCCER |
| TBA | NEWS | SPORTS NEWS | |
| BBB | EPISODE 81 OF 3 DAYS AND 2 NIGHTS | | MOVIE |

| 7days Guide | -24hr | +24hr | SCHEDULE LIST | Exit |

801

↓ 7days Guide

FIG. 8(b)

◀ KBC 1 ▶

| | Wed (9) | Thu (10) | Fri (11) | Sat (12) | Sun (13) | Mon (14) | Tue (15) |
|---|---|---|---|---|---|---|---|
| 11:00 | | | | | | | |
| 12:00 | | | | | | | |
| 13:00 | | | | | | | |
| 14:00 | | | | | | | |

| 1day Guide | -4hr | +4hr | Schedule list | Exit |

FIG. 11

| ACTUAL TIME TABLE | |
|---|---|
| 9:00 ~ 9:40 | 9 O'CLOCK NEWS |
| 9:50 ~ 10:45 | DRAMA |
| 10:50 ~ 10:58 | SPORTS NEWS |
| 11:00 ~ 11:10 | LEANING ENGLISH |
| 11:20 ~ 1:40 | MOVIE |

→

| TIME ZONE | REPRESENTATIVE THUMBNAIL IMAGE | |
|---|---|---|
| 9:00 ~ 10:00 | | 9 O' CLOCK NEWS |
| 10:00 ~ 11:00 | | DRAMA |
| 11:00 ~ 12:00 | | MOVIE |
| 12:00 ~ 1:00 | | MOVIE |
| 1:00 ~ 2:00 | | MOVIE |

FIG. 12

| ACCESS PROGRAM | NUMBER OF VIEWING TIMES | TOTAL VIEWING TIME |
|---|---|---|
| 9 O'CLOCK NEWS | 3 | 47 min |
| DRAMA | 1 | 10 min |
| ⋮ | | |

→

| TIME ZONE | REPRESENTATIVE THUMBNAIL IMAGE |
|---|---|
| 9:00 ~ 10:00 | 9 O'CLOCK NEWS |
| ⋮ | |

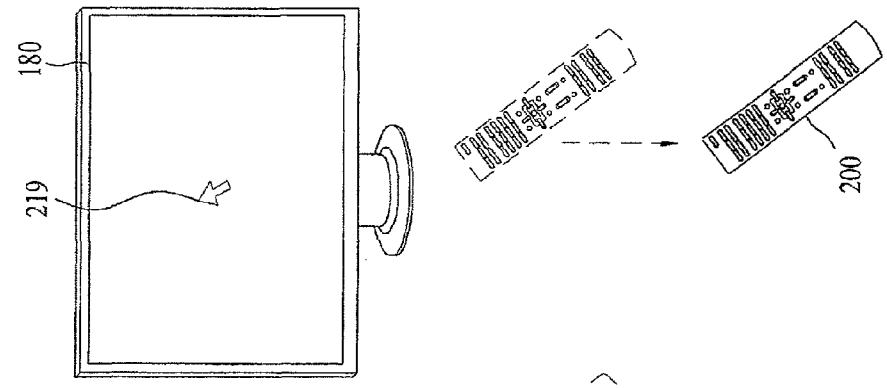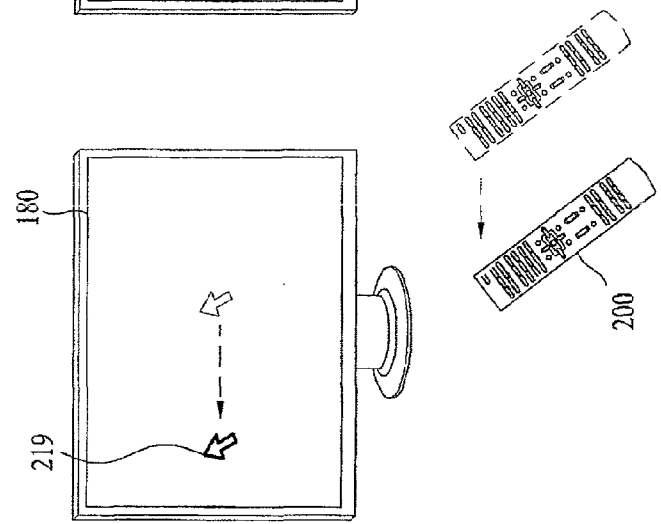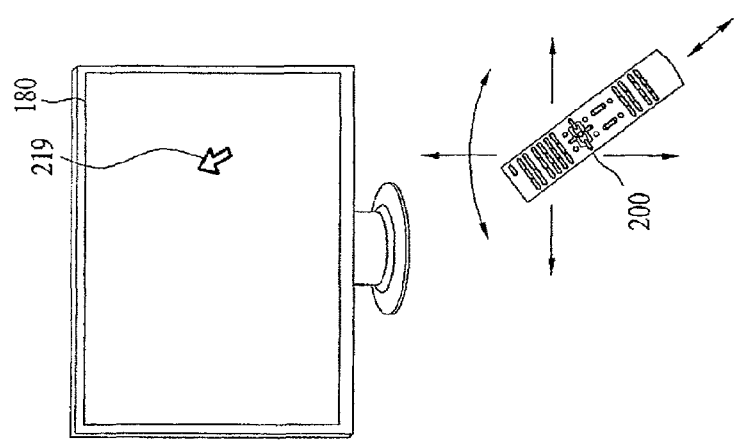

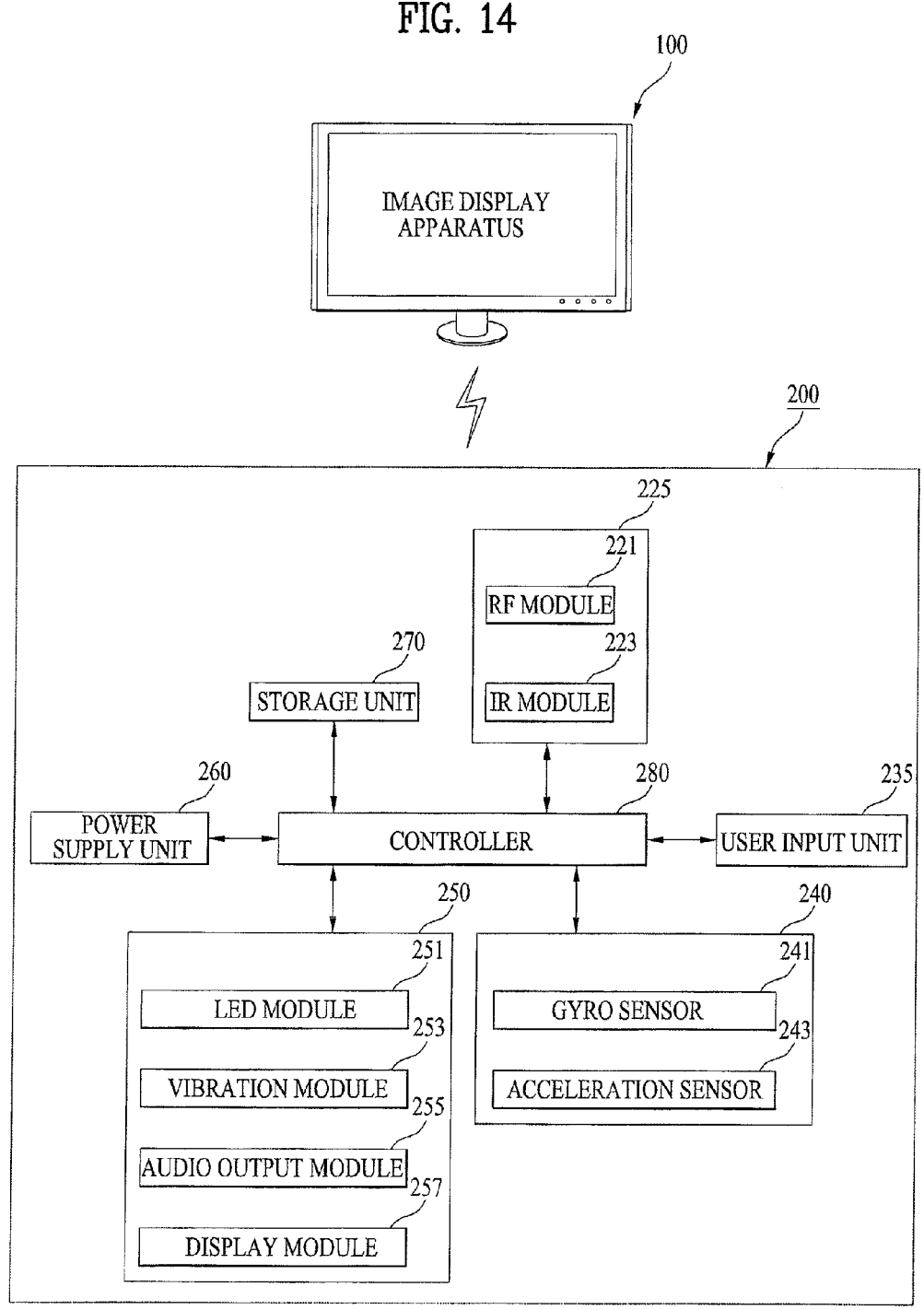

DISPLAY APPARATUS FOR PROVIDING ENHANCED ELECTRONIC PROGRAM GUIDE AND METHOD OF CONTROLLING THE SAME

This application is a Continuation of copending application Ser. No. 13/290,327, filed Nov. 7, 2011 which claims the benefit of priority of Korean Patent Application No. 10-2011-0042275 filed on May 4, 2011, the entire contents of which are hereby incorporated by reference as if fully set forth herein.

BACKGROUND OF THE INVENTION

Field of the Invention

The present invention relates to a display apparatus for providing an enhanced electronic program guide (EPG) and a method of controlling the same.

Discussion of the Related Art

A display apparatus receives, processes and displays a broadcast image which a user can view. Digital broadcasting is becoming more popular and transmits digital video and audio signals. Digital broadcasting is highly resistant to external noise and thus exhibits little data loss, is advantageous in terms of error correction, and provides a clear image at a high resolution, compared to analog broadcasting. Further, digital broadcasting provides bi-directional services.

In addition, a smart TV includes the functions an image display apparatus and also includes additional multimedia functions. The digital broadcast also includes hundreds of TV channels that may be selected by a user, and the number of channels is increasing exponentially worldwide. However, the related art Electronic Program Guide (EPG) provides only fixed text such as the title and time of a program. This inconveniences the user.

SUMMARY OF THE INVENTION

Accordingly, one object of the present invention is directed to a display apparatus for providing an enhanced electronic program guide (EPG) and a method of controlling the same.

Another object of the present invention is to provide a data transmission protocol to generate an enhanced EPG.

Another object of the present invention is to extract and display thumbnail images on an enhanced EPG.

A further object of the present invention is to provide a user interface that can be used to easily process a broadcast program displayed on an enhanced EPG.

To achieve this object and other advantages and in accordance with the purpose of the invention, as embodied and broadly described herein, the present invention provides in one aspect a method of controlling a display apparatus including receiving, via a receiving unit, first metadata corresponding to contents to be displayed on the display apparatus from at least a first source externally connected to the display apparatus, said first metadata including channel information and broadcast programs to be broadcast for each channel included in the channel information; matching, via a controller thumbnail images with the broadcast programs; generating, via the controller, an enhanced program guide including a designated time zone indicating when a broadcast program is to be broadcast and a corresponding matched thumbnail image; and displaying via the display apparatus, the enhanced program guide based on a selection signal requesting the enhanced program guide be displayed.

In another aspect of the present invention provides a network device for providing an enhanced electronic program guide (EPG). The network device includes a receiving unit configured to receive first metadata corresponding to contents to be displayed on the display apparatus from at least a first source externally connected to the display apparatus, said first metadata including channel information and broadcast programs to be broadcast for each channel included in the channel information; a controller configured to match thumbnail images with the broadcast programs, and to generate an enhanced program guide including a designated time zone indicating when a broadcast program is to be broadcast and a corresponding matched thumbnail image; and a display unit configured to display the enhanced program guide based on a selection signal requesting the enhanced program guide be displayed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 3 is a table illustrating a data structure used in a process of executing the enhanced EPG in accordance with an embodiment of the present invention;

FIG. 4 is a block diagram illustrating elements of an HBBTV for executing an enhanced EPG in accordance with an embodiment of the present invention;

FIGS. 8(a) and 8(b) are display screens illustrating a process of switching from a first mode to a second mode while executing an enhanced EPG in accordance with an embodiment of the present invention;

FIG. 11 is an overview illustrating a process of extracting a representative event used in an enhanced EPG in accordance with an embodiment of the present invention;

FIG. 12 is an overview illustrating another process of extracting a representative event used in an enhanced EPG in accordance with an embodiment of the present invention;

FIGS. 13(a) to 13(c) are overviews illustrating an external appearance of a remote controller to control a display apparatus in accordance with an embodiment of the present invention;

FIG. 14 is a block diagram illustrating an internal configuration of the remote controller for controlling a display apparatus in accordance with an embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A display apparatus stated in the following description is, for example, an intelligent network TV in which a computer support function is added to a broadcast reception function. That is, the display apparatus has an Internet function added to the broadcast reception function, and thus may be provided with an interface which is more convenient to use than an input unit in a handwriting manner, a touch screen or a remote controller.

Further, the display apparatus can be connected to the Internet or a computer by a wire or wireless Internet function, thus executing e-mail, Web browsing, banking or game functions, etc. In order to achieve these various functions, a standardized OS may be used. The display apparatus stated in the following description can also freely add or delete various applications to or from, for example, a general OS kernel, thus executing various user friendly functions.

Figure 1:
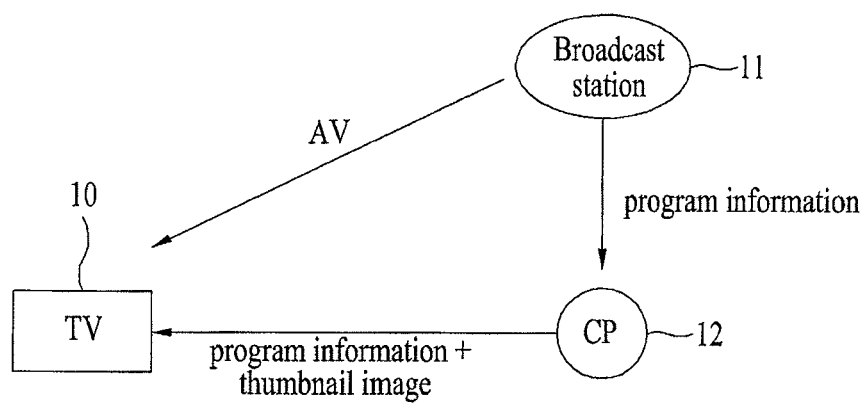
FIG. 1 is an overview illustrating a system for implementing an enhanced EPG in accordance with one embodiment of the present invention.

FIG. 1 is an overview illustrating one example of a system for implementing an enhanced EPG in accordance with one embodiment of the present invention. As shown in FIG. 1, a TV 10 receives AV data of a general broadcast program from a broadcast station 11. Further, a Content Provider (CP) 12 provides thumbnail images of respective events for the enhanced EPG by first collecting program information from the broadcast station 11. The program information corresponds to, for example, a table format in an event information table (EIT) type, and will be described in more detail later with reference to FIG. 3. Further, although the embodiment illustrates the EIT as the program information, the program information is not limited to the EIT.

The events stated herein correspond to, for example, broadcast program units. Further, the CP 12 does not depend only on the EIT information received from the broadcast station 11, but secondarily provides thumbnail image data corresponding to at least one event belonging to a random channel. The CP 12 can use the received EIT information, as it is, or define and use more compact data including only information used to execute the enhanced EPG (for example, start time, overall run time, or title information of each event).

The CP 12 also transmits the EIT information and the thumbnail image data corresponding to the respective events to the TV 10. Therefore, the TV 10 provides an EPG screen in which user recognition is more reinforced as compared to the related art fixed type text EPG. This will be described in more detail later with reference to FIG. 8.

Figure 2:
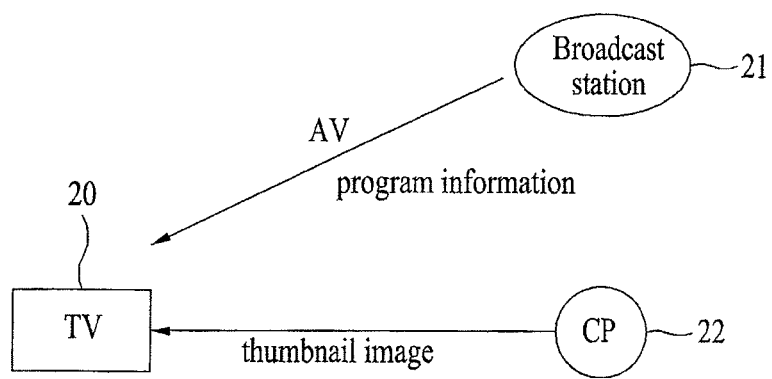
FIG. 2 is an overview illustrating another system for implementing the enhanced EPG in accordance with an embodiment of the present invention.

Next, FIG. 2 is an overview illustrating another example of the system for implementing the enhanced EPG in accordance with an embodiment of the present invention. Differing from FIG. 1, a TV 20 shown in FIG. 2 receives information through two paths. That is, the program information which is basic information to implement the enhanced EPG is transmitted from a broadcast station 21, and thumbnail image data to implement the enhanced EPG is transmitted from a CP 22. The program information corresponds to, for example, an EIT.

In addition, the TV 20 processes data received through the two different paths, and forms an enhanced EPG screen regarding events in a designated time zone by processing the combined data. The above enhanced EPG will be described in more detail later with reference to FIG. 8.

Next, FIG. 3 is a table illustrating one example of a data structure which can be used in a process of executing the enhanced EPG in accordance with an embodiment of the present invention. In the EIT shown in FIG. 3, a table_id field represents a unique identifier (ID) assigned to identify the EIT. That is, the table_id field represents a value indicating that a table to which a received section belongs is the EIT.

A section_syntax_indicator field may be set to '1' to indicate that a general MPEG-2 section syntax follows a section_length field. '1' may be assigned to a private_indicator field. Further, the section_length field represents a length from the section_length field to the end of the section, i.e., the remaining length of the section, by byte.

Also, a source_id field represents a source ID of a virtual channel transmitting events stated in the section, and a version_number field represents a version value of EIT-i. The version_number field may be represented by a remainder value obtained by adding 1 to the value of the EIT-i and then dividing the obtained sum by 32, when the content of EIT-i is changed.

A current_next_indicator field represents that the transmitted table is applicable at all times, and may be set to '1'. In addition, a section_number field represents the number of the corresponding section, and a last_section_number represents the number of the last section of the complete EIT. Further, a protocol_version field is initially set to '0', and is set to another value other than '0' when the protocol is changed. A num_events_in_section field represents the number of events present in the corresponding EIT section. The num_events_in_section field being '0' indicates that there is no event defined in the corresponding section.

After the num_events_in_section field, an event loop which is repeated by the number of the events in the section is present. Such an event loop may include an event_id field, a start_time field, an ETM_location field, a length_in_seconds field, a title_length field and a title_text( ) field.

The event loop may further include a descriptor_length field and a descriptor( ) field which are individually applied to the respective events. The event_id field represents an ID number to identify a corresponding event in the event loop. Such an ID number may be used as a part of the ETM-id.

The start_time field represents a start time of the event, and the ETM_location field represents presence and position of an extended text message (ETM). The length_in_seconds field represents a duration time of the event in seconds. In addition, the title_length field represents a length of the following title_text( ) field by byte, and the title_length field value being '0' means that a title of the corresponding event is not present.

Further, the title_text( ) field represent an event title of a multiple character string structure, and the descriptor_length field represents the total length of a following event descriptor by byte.

Also, in accordance with another embodiment of the present invention, the CP or TV does not have to use all of the EIT data shown in FIG. 3, but the minimum data used to execute the enhanced EPG (for example, the start_time field, the length_in_seconds field and the title_text( ) field) may be extracted to firstly generate a more compact data structure than the related art EIT. Then, thumbnail images corresponding to the respective events can be added to the generated data structure and the added data transmitted to the TV.

Next, FIG. 4 is a block diagram illustrating elements of a Hybrid Broadcast Broadband TV (HBBTV) 100 for executing the enhanced EPG in accordance with an embodiment of the present invention. As shown in FIG. 4, the HBBTV 100 includes, for example, a broadcast interface 101, a section filter 102, an AIT filter 103, an application data processor 104, a broadcast data processor 111, a media player 106, an Internet protocol processor 107, an Internet interface 108, and a run time module 109. Here, the present invention is not limited by the elements shown in FIG. 4, and modules may be added or deleted as desired.

Further, application information table (AIT) data, a real-time broadcast content, application data and stream events are received through the broadcast interface 101. Here, the real-time broadcast content may be referred to as linear A/V content. In addition, the section filter 102 executes section-filtering of the four data received through the broadcast interface 101, transmits the AIT data to the AIT filter 103, transmits the linear A/V content to the broadcast data processor 111, and transmits the stream events and the application data to the application data processor 104.

A non-linear A/V content and application data are also received through the Internet interface 108. Here, the non-linear A/V content, for example, may be content on demand (COD) applications. In addition, the non-linear A/V content is transmitted to the media player 106 and the application data is transmitted to the run time module 109.

Further, the run time module 109 includes, for example, an application manager and a browser, as shown in FIG. 4. The application manager, for example, controls life cycles of interactive applications using AIT data. The browser, for example, displays and processes the interactive applications.

For example, if the TV of the system shown in FIG. 2 is implemented as the HBBTV shown in FIG. 4, the HBBTV 100 is designed such that the broadcast interface 101 receives the EIT data and the Internet interface 108 receives the thumbnail image data corresponding to the events.

Figure 5:
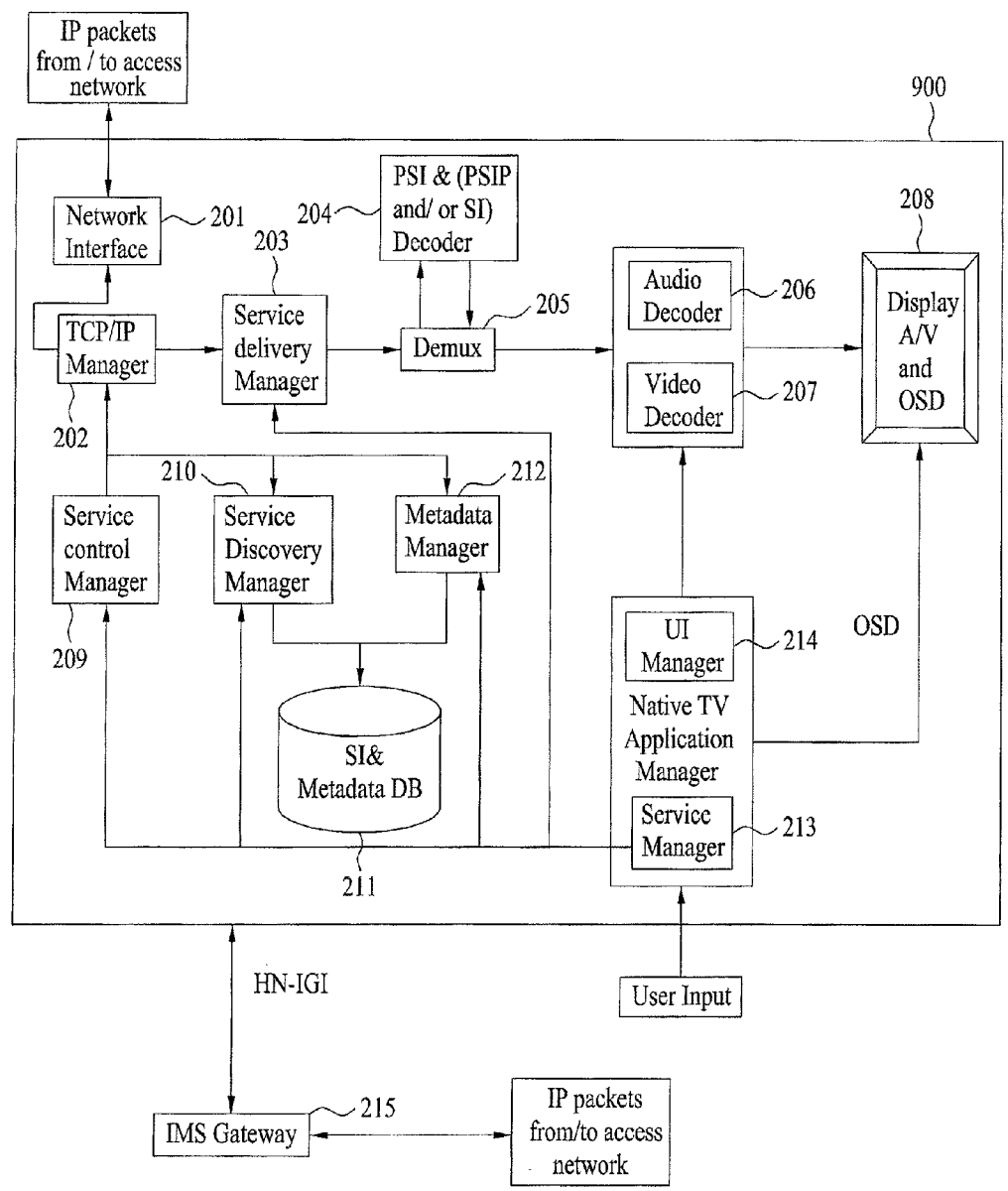
FIG. 5 is a block diagram illustrating elements of an IPTV for executing an enhanced EPG in accordance with the embodiment of the present invention.

Next, FIG. 5 is a block diagram illustrating elements of an IPTV for executing an enhanced EPG in accordance with an embodiment of the present invention. As shown in FIG. 5, an IPTV 900 includes, for example, a network interface 201, a TCP/IP manager 202, a service delivery manager 203, a demultiplexer 205, a PSI & (PSIP and/or SI) decoder 204, an audio decoder 206, a video decoder 207, display A/V and OSD module 208, a service control manager 209, a service discovery manager 210, a metadata manager 212, SI & metadata DB 211, a UI manager 214, and a service manager 213. Here, the present invention is not limited by the elements shown in FIG. 5, and modules may be added or deleted as desired.

The network interface 201 receives packets received from a network and transmits the packets to the network. That is, the network interface 201 receives services and contents from a service provider through the network. The TCP-IP manager 202 is involved in packets received by the IPTV 900 and packets transmitted from the IPTV 900, i.e., receipt and transmission of packets from a source to a destination.

Further, the TCP-IP manager 202 classifies the received packets so as to correspond to proper protocols, and outputs the classified packets to the service delivery manager 203, the service discovery manager 210, the service control manager 209 and the metadata manager 212. In addition, the service delivery manager 203 is in charge of control of received service data. For example, if the service delivery manager 203 is in charge of control real-time streaming data, the service delivery manager 203 may use RTP/RTCP.

If the service delivery manager 203 transmits the real-time streaming data using the RTP, the service delivery manager 203 executes parsing of the received data packets according to the RTP and then transmits the received data packets to the demultiplexer 205 or stores the received data packets in the SI & metadata DB 211 under the control of the service manager 213. Further, the service delivery manager 203 executes feedback of data received through the network to a server providing services using the RTCP.

In addition, the demultiplexer 205 demultiplexes the received packets to audio, video and program specific information (PSI) data, and transmits the data to the audio and video decoders 206 and 207 and the PSI & (PSIP and/or SI) decoder 204. The PSI & (PSIP and/or SI) decoder 204 decodes service data, for example, the program specific information (PSI). That is, the PSI & (PSIP and/or SI) decoder 204 receives and decodes a PSI section, a program and service information protocol (PSIP) section or a service information (SI) section demultiplexed by the demultiplexer 205.

Further, the PSI & (PSIP and/or SI) decoder 204 forms a database including service information by decoding the received section, and the database including the service information is stored in the SI & metadata DB 211. The audio and video decoders 206 and 207 decode the audio data and video data received from the demultiplexer 205. The audio data decoded by the audio decoder 206 and the video data decoded by the video decoder 207 are then provided to a user through the display A/V and OSD module 208.

The UI manager 214 and the service manager 213 manage the overall state of the image display apparatus 900, provide a user interface, and manage other managers. Further, the UI manager 214 provides a graphic user interface using an on screen display (OSD), and executes receiver operation according to key input received from the user. For example, when the key input regarding channel selection is received from the user, the UI manager 214 transmits the key input signal to the service manager 213.

The service manager 213 controls managers relating to services, such as the service delivery manager 203, the service discovery manager 210, the service control manager 209 and the metadata manager 212. Further, the service manager 213 builds a channel map and selects a channel using the channel map according to a key input received from the UI manger 214. The service manager 213 receives service information of the channel from the PSI & (PSIP and/or SI) decoder 204 and transmits an audio/video packet identifier (PID) of the selected channel to the demultiplexer 205.

Further, the service discovery manager 210 provides information used to select the service provider providing a service. When a signal regarding channel selection is received from the service manager 213, the service discovery manager 210 searches a service using the information.

In addition, the service control manager 209 is in charge of service selection and control. For example, the service control manager 209 executes service selection and control using IGMP or RTSP, if a user selects a live broadcast service in the same manner as the conventional broadcasting method, and executes service selection and control using the RTSP, if a user selects a service such as video on demand (VOD). Such RTSP may provide a trick mode to real-time streaming.

Further, the service control manager 209 can initialize and manage a session going through an IMC gateway using an IP multimedia subsystem (IMS) or a session initiation protocol (SIP). These protocols are only exemplary and other protocols may be used according to embodiments of the present invention.

The metadata manager 212 manages metadata relating to services and stores the metadata in the SI & metadata DB 211. The SI & metadata DB 211 stores the service information decoded by the PSI & (PSIP and/or SI) decoder 204, the metadata managed by the metadata manager 212 and the information used to select the service provider provided by the service discovery manager 210. Further, the SI & metadata DB 211 can store setup data of the system.

The SI & metadata DB 211 may be implemented using a nonvolatile RAM (NVRAM) or a flash memory. Further, an IMS gateway 250 is a gateway having functions used to access an IMS-based IPTV service. For example, if the TV of the system shown in FIG. 1 is implemented as the IPTV shown in FIG. 5, the IPTV 900 is designed such that the network interface 201 receives both the EIT data transmitted from the CP and the thumbnail image data corresponding to respective events. FIG. 5 also illustrates an IMS Gateway 215 interfacing with the IPTV 900.

Figure 6:
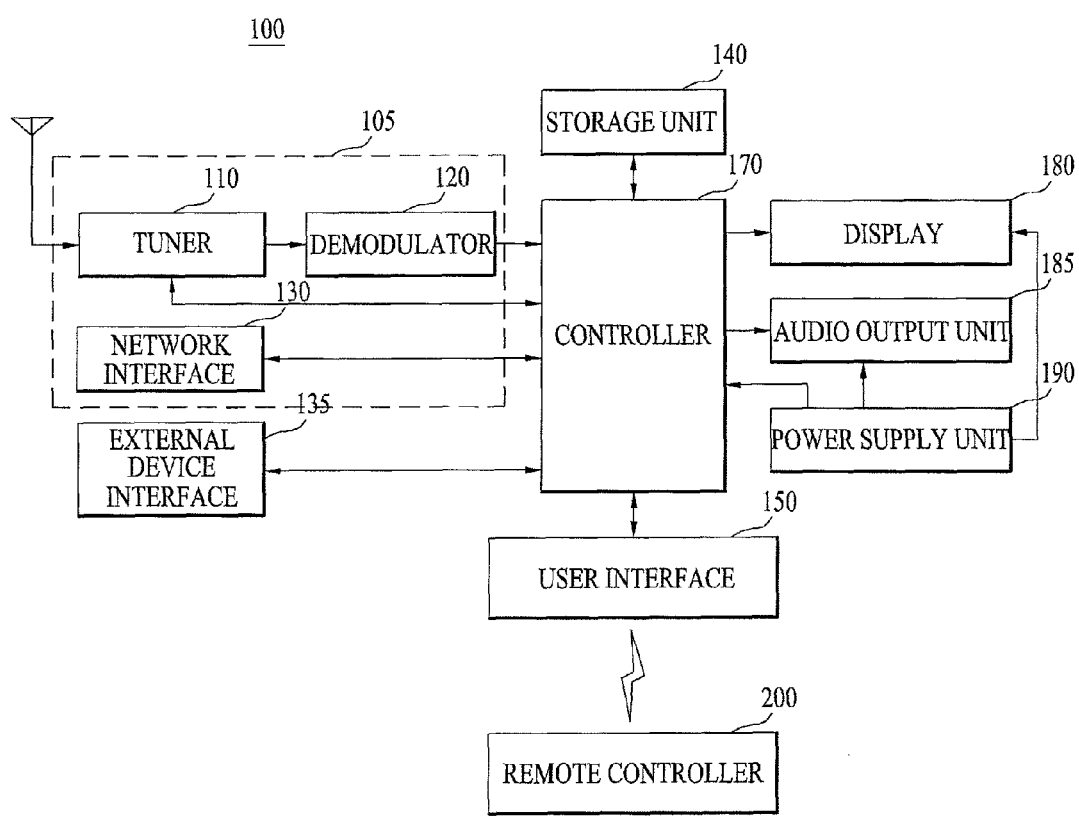
FIG. 6 is a block diagram illustrating an HBBTV including an external device interface.

Next, FIG. 6 is a block diagram illustrating the HBBTV 100 including an external device interface. Although FIG. 6 illustrates the HBBTV 100 including a display module, a network device (for example, an STB) which does not include the display module shown in FIG. 6 may be applied to the present invention.

As shown in FIG. 6, the HBBTV 100 in accordance with another embodiment of the present invention includes a broadcast receiver 105, an external device interface 135, a storage unit 140, a UI interface 150, a controller 170, a display 180, an audio output unit 185, and a power supply unit 190. A photographing unit can also be included.

The broadcast receiver 105 includes a tuner 110, a demodulator 120 and a network interface 130. The broadcast receiver 105 may be designed to include the tuner 110 and the demodulator 120 without the network interface 130 or include only the network interface 130 without the tuner 110 and the demodulator 120, as desired.

Further, the tuner 110 selects radio frequency (RF) broadcast signals corresponding to a channel selected by a user or all channels stored in advance from among RD broadcast signals received through an antenna. The demodulator 120 receives a digital IF (DIF) signal converted by the tuner 110 and executes a demodulation process.

In addition, the demodulator 120 can output a stream signal after execution of demodulation and channel decoding. Here, the stream signal may be a signal in which a video signal, an audio signal and/or a data signal are multiplexed. For example, the steam signal may be a multiplexed MPEG-2 transport stream (TS) in which an MPEG-2 standard video signal and a Dolby AC-3 standard audio signal are multiplexed. Specifically, the MPEG-2 TS may include a header of 4 bytes and a payload of 184 bytes.

Further, the stream signal output from the demodulator 120 can be input to the controller 170. The controller 170 then outputs an image to the display 180 and outputs audio to the audio output unit 185 after execution of demultiplexing and video/audio signal processing. Also, the external device interface 135 can connect the HBBTV 100 to an external device. For this purpose, the external device interface 135 may include A/V input/output units and a wireless communication unit.

The external device interface 135 can also be connected to an external device such as a digital versatile disc (DVD), a blue-ray disc (BD) player, a game machine, a camera, a camcorder or a computer (notebook), by wire or wirelessly. Further, the external device interface 135 can receive applications or an application list in an adjacent external device and transmit the applications or the application list to the controller 170 or the storage unit 140.

The network interface 130 may include, for example, an Ethernet terminal for connection with a wired network, and use, for example, wireless LAN (WLAN) (Wi-Fi), wireless broadband (Wibro), world interoperability for microwave access (Wimax), and high speed downlink packet access (HSDPA) communication standards for connection with a wireless network. Further, the network interface 130 may selectively receive a desired application from among applications open to the public through a network.

In addition, the storage unit 140 can store programs to process and control the respective signals in the controller 170 or store the video, audio or data signal which has been processed. Further, the storage unit 140 can execute a function of temporarily storing the video, audio or data signal input from the external device interface 135 or the network interface 130. The storage unit 140 can also store the applications or the application list input from the external device interface 135 or the network interface 130.

The UI interface 150 transmits a signal input by a user to the controller 170, or transmits a signal from the controller 170 to the user. For example, the UI interface 150 may receive and process a control signal regarding power ON/OFF, channel selection or screen setting from a remote controller 200, or transmits a control signal from the controller 170 to the remote controller 200, according to various communication schemes such as a radio frequency (RF) communication scheme and an IR communication scheme.

In addition, the controller 170 can demultiplex a stream input through the tuner 110, the demodulator 120 or the external device interface 135 or process demultiplexed signals, thus generating and outputting signals to output an image or audio. The video signal processed by the controller 170 can then be input to the display 180, and the display 180 can display an image corresponding to the corresponding video signal.

Further, the video signal processed by the controller 170 can be input to an external output device through the external device interface 135. The audio signal processed by the controller 170 can be input to the audio output unit 185, and the audio output unit 185 then outputs audio. Also, the audio signal processed by the controller 170 can be input to the external output device through the external interface 135.

In addition, the display 180 converts the video signal, the data signal or the OSD signal processed by the controller 170 or the video signal or the data signal received by the external device interface unit 135, into R, G and B signals, thus generating a drive signal. The display 180 can use a PDP, an LCD, an OLED, a flexible display or a 3D display.

Further, the audio output unit 185 receives the audio signal processed by the controller 170, for example, a stereo signal, a 3.1 channel signal or a 5.1 channel signal, and then outputs audio. The audio output unit 185 may also use various types of speakers.

In addition, the power supply unit 190 supplies corresponding power to the elements of the HBBTV 100. Particularly, the power supply unit 190 can supply power to the controller 170 implemented in a system on chip (SOC) type, the display 180 to display an image, and the audio output unit 185 to output audio.

The remote controller 200 also transmits user input to the UI interface 150. For this purpose, the remote controller 200 can use a BLUETOOTH communication scheme, a radio frequency (RF) communication scheme, an IR communication scheme, an ultra-wideband (UWB) communication scheme or a ZigBee communication scheme. Particularly, the remote controller 200 will be described later with reference to FIGS. 13 and 14.

Also, the tuner 110 receives AV data of broadcast programs. The tuner 110 can also be replaced by a first network interface. Further, instead of the tuner 110, the network interface 130 can be designed to receive AV data. Here, the AV data corresponds to, for example, data transmitted from an external CP or data transmitted from a broadcast station.

In addition, the network interface 130 receives information regarding at least one event provided by each channel and a thumbnail image corresponding to the event. For example, the network interface 130 may be designed as a second network interface. Therefore, the above-described first network and second network may be designed as different communication networks or as the same communication network.

Further, the UI interface 150 receives a command signal to execute the enhanced EPG, and the controller 170 detects a representative event from at least one event belonging to a designated time zone. Also, an OSD generator 340 shown in FIG. 7 generates an enhanced EPG on screen display (OSD) including a thumbnail image corresponding to the detected representative event in the designated time zone. The above OSD generator 340 will be described in detail later with reference to FIG. 7.

In addition, the term "enhanced EPG OSD" means, for example, an image of the enhanced EPG information in accordance with one embodiment of the present invention, which is displayed on a screen. Further, the above image may be designed to occupy the entirety of the screen or to be overlaid on another screen.

Also, in accordance with the embodiment of the present invention, the display 180 is designed to output the generated enhanced EPG OSD. Further, in accordance with another embodiment of the present invention, the display 180 is omitted. For example, the display 180 can be replaced by a transmission module to transmit the generated enhanced EPG OSD to an external display device. The network interface 130 shown in FIG. 6 may also be designed to execute the function of such a transmission module.

The above-described enhanced EPG OSD will be described in more detail with reference to FIG. 8. Further, in accordance with another embodiment of the present invention, the controller 170 calculates time-based shares of the respective events belonging to the designated time zone, and to regard an event having the highest time-based share as a representative event based on a result of the calculation. This will be described in detail later with reference to FIG. 11.

In accordance with yet another embodiment, the controller 170 detects access histories of the respective events belonging to the designated time zone, and to regard an event having the highest access priority as a representative event. The access history includes at least one of the number of access attempts to each event and the total display time of each event.

Figure 7:
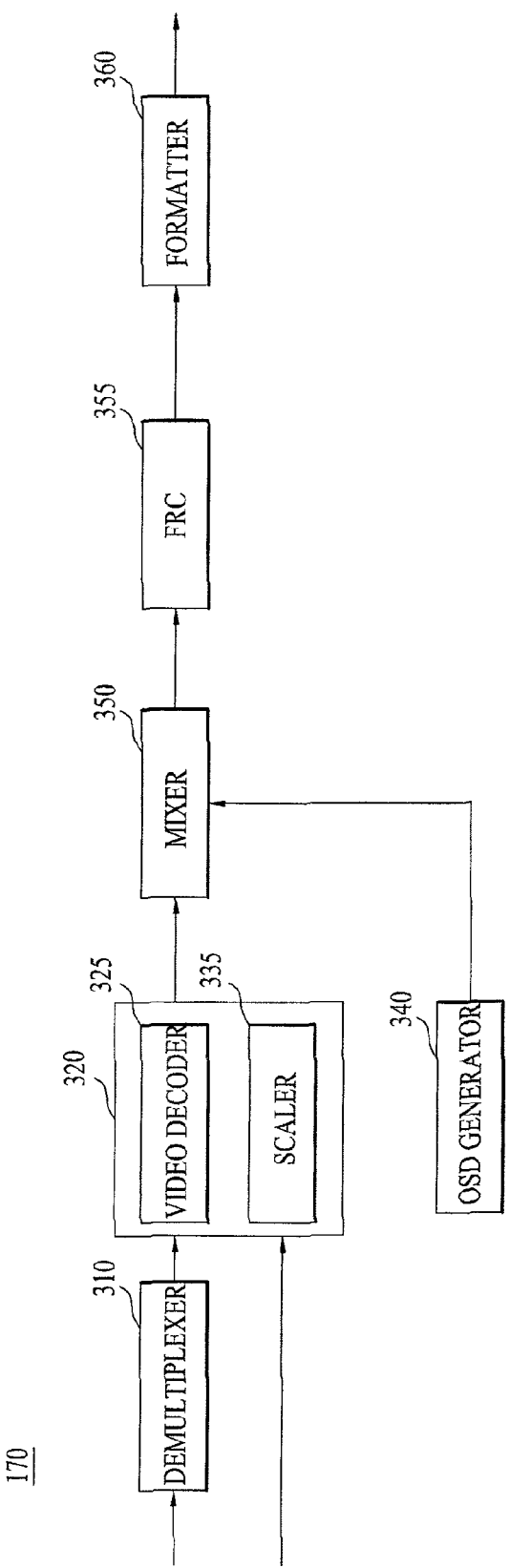
FIG. 7 is a block diagram illustrating a controller shown in FIG. 6.

Next, FIG. 7 is a block diagram illustrating the controller 170 shown in FIG. 6. The controller 170 can be designed to be used by other display apparatuses (for example, a smart TV, a Web TV, an IPTV, a network TV, etc.) instead of the HBBTV.

As shown in FIG. 7, the controller 170 includes a demultiplexer 310, a video processor 320, the OSD generator 340, a mixer 350, a frame rate converter 355, and a formatter 360. The controller 170 may also include an audio processor and a data processor.

Further, the demultiplexer 310 demultiplexes an input stream, and the video processor 320 processes a demultiplexed video signal. Therefore, the video processor 320 includes a video decoder 325 and a scaler 335. Also, the video decoder 325 decodes the demultiplexed video signal, and the scaler 335 executes scaling to increase resolution of the decoded video signal so as to be output through the display 180. The video signal decoded by the video processor 320 is then input to the mixer 350.

The OSD generator 340 generates an OSD signal according to user input or by itself. For example, the OSD generator 340 can generate a signal to display various pieces of information in graphic or text on the screen of the display 180, based on the control signal from the UI interface 150. The OSD generator 340 can also generate an OSD including a main region which displays a thumbnail image corresponding to a representative event in a specific time zone and a sub-region which guides the number of events belonging to the designated time zone. This will be described in detail later with reference to FIG. 15.

In addition, the mixer 350 mixes the OSD signal generated by the OSD generator 340 and the decoded video signal processed by the video processor 320. The mixed signal is then provided to the formatter 360. Further, the OSD may be overlaid on a broadcast image or an external input image due to mixing of the decoded broadcast video signal or external input signal with the OSD signal.

Also, the frame rate converter (FRC) 355 can convert a frame rate of an input image. For example, the FRC 355 converts a frame rate of 60 Hz into 120 Hz or 240 Hz. If the frame rate of 60 Hz is converted into 120 Hz, another first frame or a third frame predicted from the first frame and the second frame can be interposed between the first frame and the second frame. If the frame rate of 60 Hz is converted into 240 Hz, three first frames or three predicted frames can be interposed between the first frame and the second frame. Alternatively, the input frame rate may be maintained without conversion.

The formatter 360 receives a signal output from the FRC 355, changes a format of the signal so as to be suitable for the display 180, and then outputs the changed signal. For example, the formatter 360 can output R, G and B data signals, and the R, G and B data signals can be output using low voltage differential signaling (LVDS) or mini-LVDS.

Next, FIGS. 8(*a*) and 8(*b*) are display screens illustrating a process of switching from a first mode to a second mode while executing the enhanced EPG in accordance with an embodiment of the present invention. As shown in FIGS. 8(*a*) and 8(*b*), the enhanced EPG includes two modes. In the first mode shown in FIG. 8(*a*), event information of all channels in each time of 1 day is displayed. On the other hand, in the second mode shown in FIG. 8(*b*), all event information of a specific channel for 7 days is displayed.

In addition, as described above, the OSD displaying thumbnail images corresponding to the respective events is generated, thus providing a more enhanced EPG screen. Further, in order to improve user convenience, a tab 801 to select each mode can be designed in a toggle type. Respective elements of the mode in the enhanced EPG screen shown in FIG. 8(*b*) will be described in detail later with reference to FIG. 10.

Figures 9A, 9B:
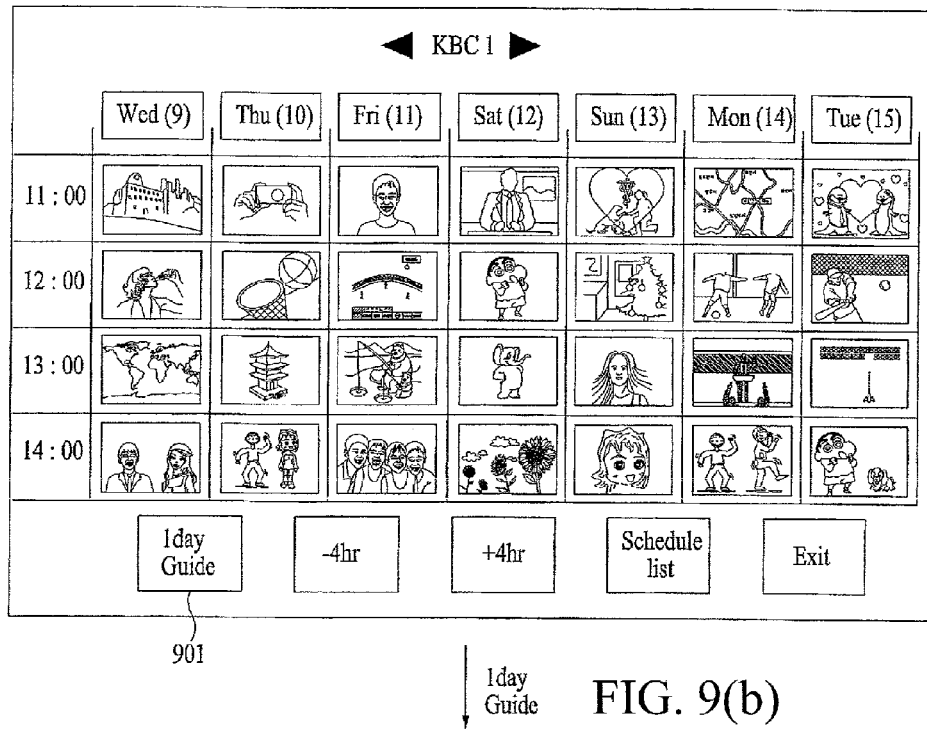
FIGS. 9(a) and 9(b) are display screens illustrating a process of switching from the second mode to the first mode while executing an enhanced EPG in accordance with another embodiment of the present invention.

FIGS. 9(*a*) and 9(*b*) are display screens illustrating a process of switching from the second mode to the first mode while executing the enhanced EPG in accordance with an embodiment of the present invention. Differently from FIGS. 8(*a*) and 8(*b*), FIGS. 9(*a*) and 9(*b*) illustrate the process of switching from the second mode to the first mode. For example, when a tab 901 displaying a 1 day guide is selected in the second mode of the enhanced EPG shown in FIG. 9(*a*), event information of all channels in each time of 1 day is displayed as shown in FIG. 9(*b*).

Figure 10:
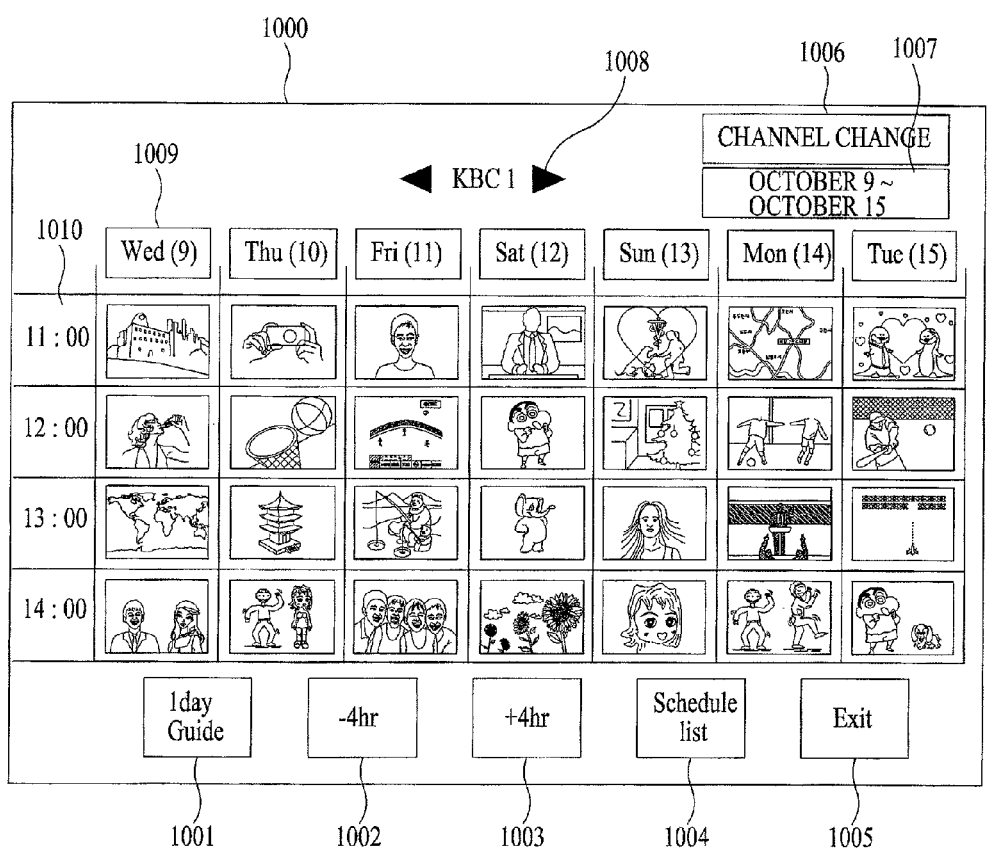
FIG. 10 is a display screen illustrating a specific mode during execution of an enhanced EPG in accordance with an embodiment of the present invention in detail.

Next, FIG. 10 is a display screen illustrating a specific mode during execution of the enhanced EPG in accordance with an embodiment of the present invention in detail. FIG. 10 is an enlarged view of FIG. 8(*b*) or 9(*a*). As shown, the display apparatus 1000 received an executing command of the enhanced EPG and displays event information of a specific channel for 7 days. In particular, thumbnail images corresponding to respective events are displayed. If a 1 day guide tab 1001 shown in FIG. 10 is selected, the screen is switched to the screen of FIG. 8(*a*) or 9(*b*).

Further, an indicator 1008 allowing a user to easily select a desired channel is displayed. A window 1006 allowing the user to directly input a specific channel is also displayed. Differing from the related art EPG, the enhanced EPG in accordance with an embodiment of the present invention is divided by a time scale 1010 and a day scale 1009 and displays a tab 1007 allowing the user to select a desired week.

Further, in consideration of the size of the screen, for example, the EPG is configured every 4 hours, and a tab 1002 allowing the user to select a previous 4 hours and a tab 1003 allowing the user to select a next 4 hours are additionally displayed, thereby increasing user convenience. The respective events displayed on the enhanced EPG shown in FIG. 10 may also be reserved, and a schedule list tab 1004 is provided to process reservation of the events. This will be described in more detail later with reference to FIGS. 17 to 21. The enhanced EPG also has a function of returning to the former screen instead of the screen shown in FIG. 10, and such a function is executed by allowing the user to select an exit tab 1005 shown in FIG. 10.

Next, FIG. 11 is an overview illustrating one process of extracting a representative event used in the enhanced EPG in accordance with an embodiment of the present invention. In particular, the previous FIG. 10 illustrates one thumbnail image being displayed in each time zone (for example, every 1 hour), but at least two events may belong to each time zone. Therefore, information to decide which thumbnail image corresponding to one event is determined in each time zone.

The left side of FIG. 11 shows a time table of actual broadcast programs (events). As shown, two events including the "9 o'clock news" and "drama" are present between 9 o'clock and 10 o'clock, and two events including "drama" and "sports news" are present between 10 o'clock and 11 o'clock. Further, two events including "learning English" and "movie" are present between 11 o'clock and 12 o'clock.

In accordance with one embodiment of the present invention, an event occupying the longest time in each time zone is designated as the top priority. Therefore, as shown in the right side of FIG. 11, a thumbnail image corresponding to an event having the top priority between 9 o'clock and 10 o'clock, i.e., "9 o'clock news", is designated as a representative thumbnail image. If there are plural events occupying the same time, the top priority is granted to an event having an earlier start time.

Such a process is performed in consideration of the general user desire not to display events (broadcast programs) having short run times on the EPG. Solutions to satisfy other users' desire to confirm the overall events will be described later with reference to FIGS. 15 and 16.

Next, FIG. 12 is an overview illustrating another process of extracting a representative event used in the enhanced EPG in accordance with an embodiment of the present invention. The process of FIG. 12 differs from the process of FIG. 11 in that the process of FIG. 12 uses a user profile.

In particular, the user profile corresponds to, for example, the number of viewing times of a specific event or the total viewing time of the specific event. As shown in the left side of FIG. 12, two events including the "9 o'clock news" and "drama" are present between 9 o'clock and 10 o'clock. Further, information indicating that the "9 o'clock news" has been viewed three times for a total of 47 minutes is stored in the memory 140. For example, information indicating that "drama" was viewed one time for a total of 10 minutes is stored in the memory 140.

Therefore, as shown in the right side of FIG. 12, "9 o'clock news" having the largest number of viewing times and the longest total viewing time is designated as a representative event in the above-described time zone (between 9 o'clock and 10 o'clock). In accordance with another embodiment of the present invention, a representative event may be designated using one of the number of viewing times and the total viewing time. Further, a representative event may be designated by applying different weight values to the number of viewing times and the total viewing time.

As described above with reference to FIGS. 11 and 12, there are two methods for extracting representative events used in the enhanced EPG in accordance with an embodiment of the present invention. Two other methods for extracting representative events in accordance with another embodiment of the present invention will now be described.

A first method collects information regarding audience ratings of events belonging to each time zone (for example, every 1 hour). The information regarding audience ratings may be received from, for example, an external CP. In particular, assume three events (an event A, an event B and an event C) are present between 9 o'clock and 10 o'clock, the audience rating of the event A is 15%, the audience rating of the event B is 10% and the audience rating of the event C is 25%.

Therefore, in this method, a representative event in a specific time zone (for example, between 9 o'clock and 10 o'clock) is designated according to audience rating. That is, the event C having the audience rating of 25% is selected as the representative event and is displayed on the EPG screen.

A second method collects additional information regarding Social Network Service (SNS) of events in each time zone (for example, every 1 hour). The additional information regarding SNS may be received from, for example, a specific SNS server (for example, FACEBOOK or TWITTER). For example, assume three events (an event D, an event E and an event F) are present between 9 o'clock and 10 o'clock, and priorities are granted to the respective events according to the additional information regarding SNS.

Here, the top priority may be granted to an event having the largest number of recommendations of a specific SNS, or be granted to an event having the largest number of followers of a specific SNS. Therefore, in this method, an event having the top priority according to the additional information regarding a SNS is selected as a representative event and is displayed on the EPG screen.

Although the four methods of deciding representative events are described above, two or more methods of the four methods may be combined.

Next, FIGS. 13(a) to 13(c) are overviews illustrating an external appearance of the remote controller 200 to control the display 180 in accordance with an embodiment of the present invention. In particular, FIG. 13(a) illustrates a pointer 219 displayed on the display 180 corresponding to the remote controller 200. Further, the display 180 corresponds to, for example, the display modules of the devices shown in FIGS. 4 to 6.

A user can then move or rotate the remote controller 200 in the upward and downward direction and in the leftward and rightward direction as shown in FIG. 13(b) and in the forward and backward direction as shown in FIG. 13(c). That is, the movement of the pointer 219 displayed on the display 180 of the image display apparatus corresponds to movement of the remote controller 200. Such a remote controller 200 also moves in a 3D space to move the corresponding pointer 219 as shown in FIGS. 13(a) to 13(c), and thus may be referred to as a space remote controller.

In addition, FIG. 13(b) illustrates that, when the user moves the remote controller 200 leftwards, the pointer 219 displayed on the display 180 of the image display apparatus moves leftwards corresponding to movement of the remote controller 200. Further, information regarding movement of the remote controller 200 sensed by a sensor of the remote controller 200 is transmitted to the image display apparatus. The image display apparatus can also calculate coordinates of the pointer 219 from the information regarding movement of the remote controller 200, and then display the pointer 219 so as to correspond to the calculated coordinates.

Further, FIG. 13(c) illustrates the user moving the remote controller 200 away from the display 180 while the user presses a specific button of the remote controller 200. Thereby, a selection region in the display 180 corresponding to the pointer 219 can be zoomed in, thus being enlarged. On the other hand, when the user moves the remote controller 200 towards the display 180, the selection region in the display 180 corresponding to the pointer 219 can be zoomed out, thus being reduced. Further, when the remote controller 200 moves away from the display 180, the selection region can be zoomed out, and when the remote controller 200 moves towards the display 180, the selection region can be zoomed in.

In addition, in order to select an event to be added to the schedule list from the enhanced EPG screen in accordance with an embodiment of the present invention, the remote controller 200 shown in FIGS. 13(a) to 13(c) can be used, and this will be described in detail later with reference to FIGS. 17 to 21.

Next, FIG. 14 is a block diagram illustrating the internal configuration of the remote controller 200. As shown in FIG. 14, the remote controller 200 includes, for example, a wireless communication unit 225, a user input unit 235, a sensor unit 240, an output unit 250, a power supply unit 260, a storage unit 270 and a controller 280.

The wireless communication unit 225 transmits/receives a signal to/from any one of the above-described image display apparatuses in accordance with the embodiments of the present invention. Also, one image display apparatus 100 from among the image display apparatuses in accordance with the embodiments of the present invention will be described.

In this embodiment, the remote controller 200 includes an RF module 221 which can transmit/receive a signal to/from the image display apparatus 100 according to the RF communication standard. Further, the remote controller 200 includes an IR module 223 which can transmit/receive a signal to/from the image display apparatus 100 according to the IR communication standard.

In this embodiment, the remote controller 200 transmits a signal containing information regarding movement of the remote controller 200, etc. to the image display apparatus 100 through the RF module 221. Further, the remote controller 200 can receive a signal transmitted from the image display apparatus 100 through the RF module 221. In addition, the remote controller 200 can transmit a command regarding power ON/OFF, channel change, volume change, etc. to the image display apparatus 100 through the IR module 223.

The user input unit 235 can also include a key pad, a touch pad or a touch screen. A user can then input a command regarding the image display apparatus 100 to the remote controller 200 by manipulating the user input unit 235. Further, the sensor unit 240 includes a gyro sensor 241 and an acceleration sensor 243. The gyro sensor 241 senses information regarding movement of the remote controller 200.

For example, the gyro sensor 241 can sense information regarding movement of the remote controller 200 based on x, y and z axes. The acceleration sensor 243 can also sense information regarding the moving velocity of the remote controller 200. The sensor unit 240 may also include a distance sensor for sensing a distance from the display 180.

Further, the output unit 250 can output a video or audio signal corresponding to manipulation of the user input unit 235 or the signal transmitted from the image display apparatus 100. The user can thus recognize whether or not the user input unit 235 is manipulated or whether or not the image display apparatus 100 is controlled through the output unit 250.

For example, the output unit 250 includes an LED module 251 that is turned on when the user input unit 235 is manipulated or the signal of the image display apparatus 100 is transmitted/received through the wireless communication unit 225, a vibration module 253 to generate vibration, an audio output module 255 to output audio, and a display module 257 to output an image.

The power supply unit 260 also supplies power to the remote controller 200. Further, the power supply unit 260 stops power supply when the remote controller 200 does not move for a designated time, thereby reducing power consumption. The power supply unit 260 can also resupply power to the remote controller 200 when a designated key provided on the remote controller 200 is manipulated.

In addition, the storage unit 270 can store various kinds of programs used to control or operate the remote controller 200 and application data. If the remote controller 200 transmits/receives a signal to/from the image display apparatus 100 through the RF module 221 wirelessly, the remote controller 200 and the image display apparatus 100 transmit/receive the signal to/from each other through a designated frequency band. The control unit 280 of the remote controller 200 can also store information regarding the frequency band through which the remote controller 200 transmits/receives the signal to/from the image display apparatus 100 paired with the remote controller 200, within the storage unit 270 and refer to the stored information.

The controller 280 also controls various factors regarding control of the remote controller 200. The controller 280 can transmit a signal corresponding to manipulation of the designated key of the user input unit 235 or a signal corresponding to movement of the remote controller 200 sensed by the sensor unit 240 to the image display apparatus 100 through the wireless communication unit 225.

Particularly, the user interface of the image display apparatus 100 shown in FIG. 14 can receive a command signal from the remote controller 200 transmitting an input signal according to motion of the user.

Figure 15:
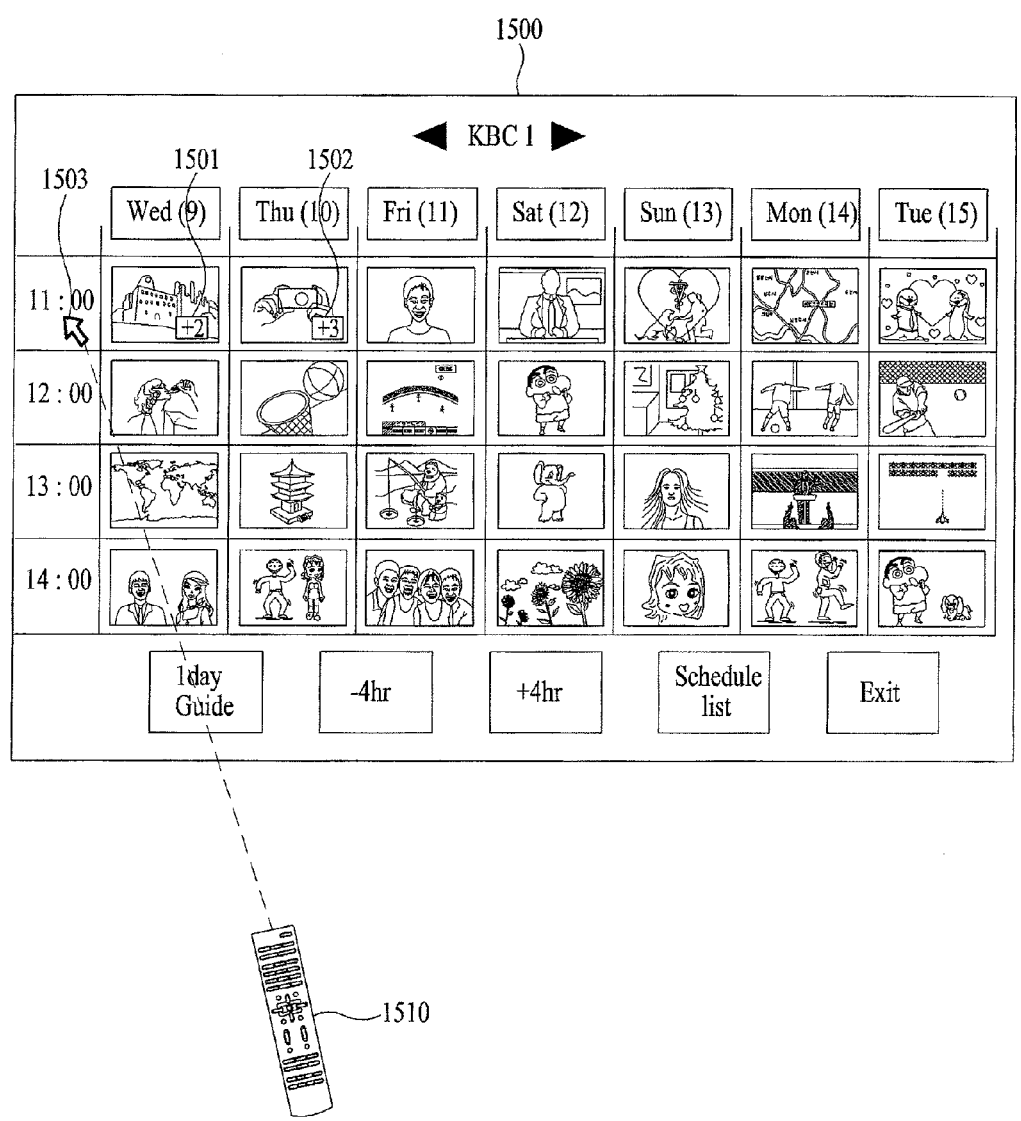
FIG. 15 is a display screen illustrating a first OSD screen provided by an enhanced EPG in accordance with an embodiment of the present invention.

Next, FIG. 15 is a display screen illustrating a first OSD screen provided by the enhanced EPG in accordance with an embodiment of the present invention. As previously shown in FIG. 11, at least two events may be present in each time zone. Therefore, the display apparatus 1500 in accordance with an embodiment of the present invention represents that other events in addition to the event corresponding to the representative thumbnail image displayed in each time zone are present using EIT information.

As shown in FIG. 15, for example, if two specific events are present in a time zone between 11 o'clock and 12 o'clock, a sub-indicator 1501 indicating "+2" is displayed. If three specific events are present in the above time zone, a sub-indicator 1502 indicating "+3" is displayed. Alternatively, numerals indicated by the sub-indicators may be numerals (N−1) except for the event corresponding to the current displayed representative thumbnail image.

Further, the remote controller described with reference to FIGS. 13 and 14 corresponds to the remote controller 1510 shown in FIG. 15. Here, if the arrow indicator 1503, the position of which is varied according to movement of the remote controller 1510 is located at a region displaying the above specific time zone, an OSD screen shown in FIG. 16 is displayed.

Figure 16:
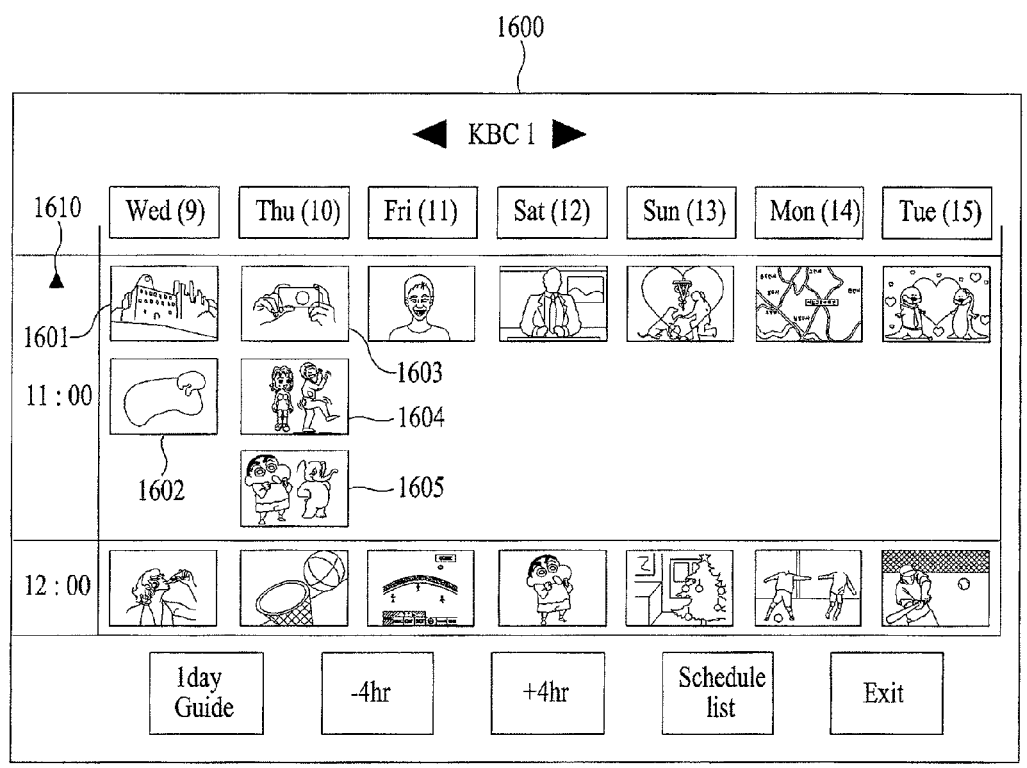
FIG. 16 is a display screen illustrating a second OSD screen provided by an enhanced EPG in accordance with an embodiment of the present invention.

In particular, FIG. 16 is a display screen illustrating a second OSD screen provided by the enhanced EPG in accordance with an embodiment of the present invention. According to control of the remote controller 1510 shown in FIG. 15, the first OSD screen shown in FIG. 15 is switched to the second OSD screen shown in FIG. 16.

The display apparatus 1600 in accordance with an embodiment of the present invention displays thumbnail images of all events in each time zone. As shown in FIG. 16, if two specific events are present in a time zone between 11 o'clock and 12 o'clock, the display apparatus 1600 displays thumbnail images 1601 and 1602 corresponding to the two specific events such that the thumbnail images 1601 and 1602 are spread in order of time. If three specific events are present in the above time zone, the display apparatus 1600 displays thumbnail images 1603, 1604 and 1605 corresponding to the three specific events such that the thumbnail images 1603, 1604 and 1605 are spread in order of time.

Further, in order to increase user convenience, the second OSD shown in FIG. 16 is switched to the first OSD shown in FIG. 15 when the arrow indicator 1503 of the remote controller 1510 shown in FIG. 15 is located at a specific tab 1610 shown in FIG. 16. A process of switching from the EPG screen shown in FIG. 15 to the EPG screen shown in FIG. 16 will now be described in more detail. First, as shown in FIG. 15, a first enhanced EPG including a thumbnail image corresponding to the detected representative event in the designated time zone (11:00) and information (the indicator 1501 or 1502) to indicate the number of events belonging to the designated time zone is displayed.

Then, when a specific region (for example, a region displaying the time zone or the indication information) of the first enhanced EPG guide is selected through the user interface 1510, as shown in FIG. 16, a second enhanced EPG including plural thumbnail images corresponding to all events belonging to the designated time zone (if Wednesday, the images 1601 and 1602, and if Thursday, images 1603 to 1605) is displayed.

Figure 17:
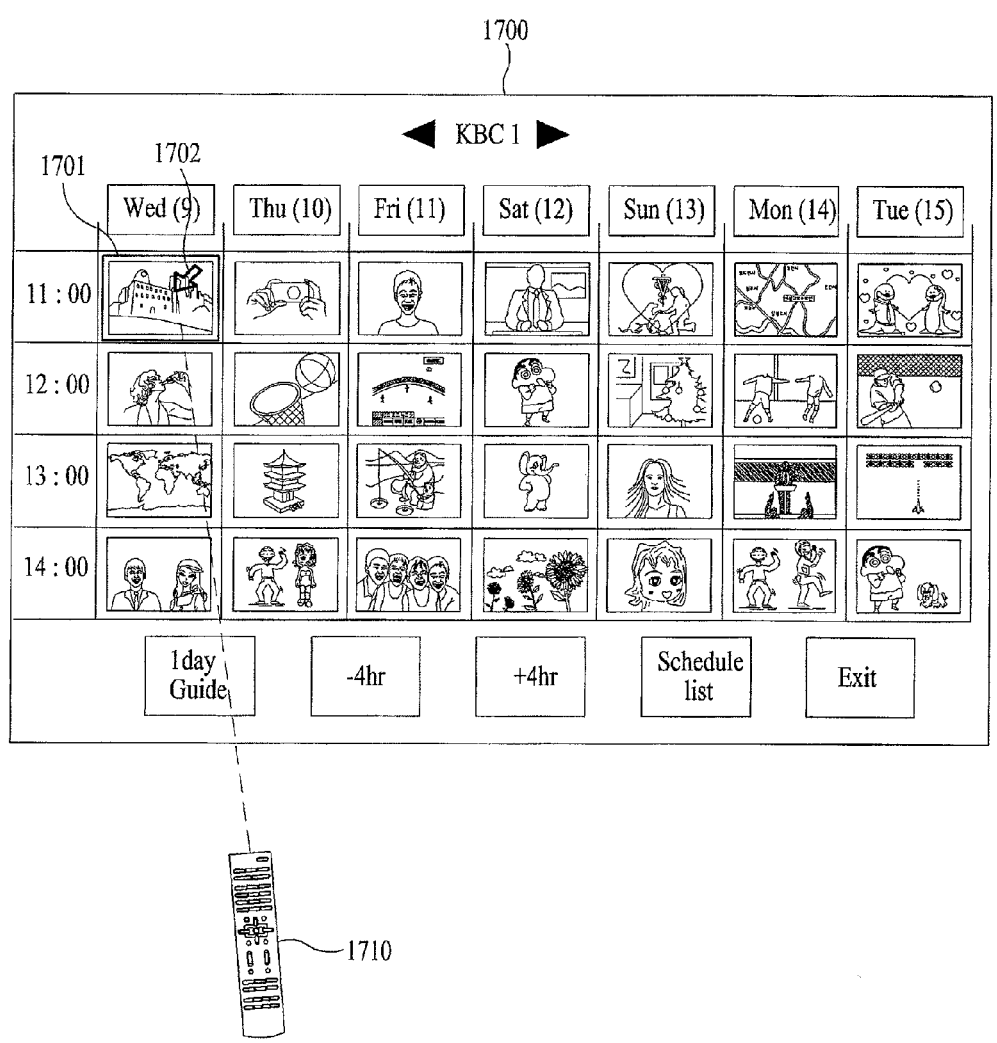
FIGS. 17 and 18 are display screens illustrating first user interfaces to store a specific event, displayed on an enhanced EPG in accordance with an embodiment of the present invention, within a schedule list.
Figure 18:
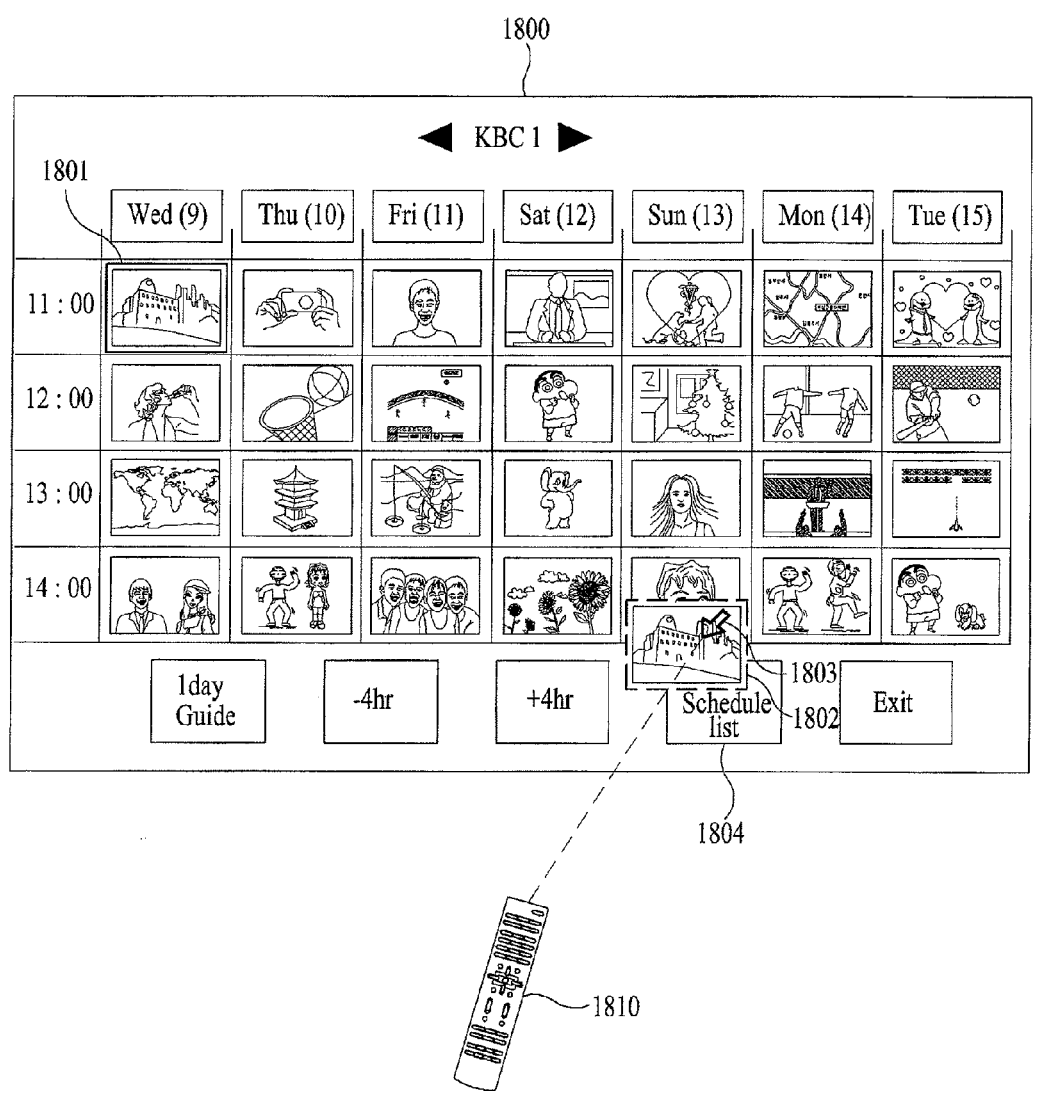

Next, FIGS. 17 and 18 are display screens illustrating first user interfaces to store a specific event displayed on the enhanced EPG in accordance with an embodiment of the present invention within a schedule list. As shown in FIG. 17, the display apparatus 1700 outputs an enhanced EPG screen. In addition, the arrow indicator 1702, the position of which is varied according to movement of the remote controller 1710, is located at a thumbnail image 1701 of a specific event. The remote controller 1710 corresponds to the above-described remote controller 200 shown in FIGS. 13 and 14.

Further, assume the user of the display apparatus 1700 wants to add an event corresponding to the thumbnail image 1701 to the schedule list. As shown in FIG. 18, when the user moves a specific thumbnail image 1801 to a schedule list tab 1804 using an arrow indicator 1803 of the remote controller 1810, the display apparatus 1800 moves the position of the specific thumbnail image 1801 to a second place 1802 and then displays the specific thumbnail image 1801.

Additional information (for example, start time) of an event corresponding to the thumbnail image moved to the schedule list tab 1804 is also stored in the memory. Therefore, when the start time of the event has come, the event may be stored or an OSD asking if the user wants to view the event may be generated and displayed.

Figure 19:
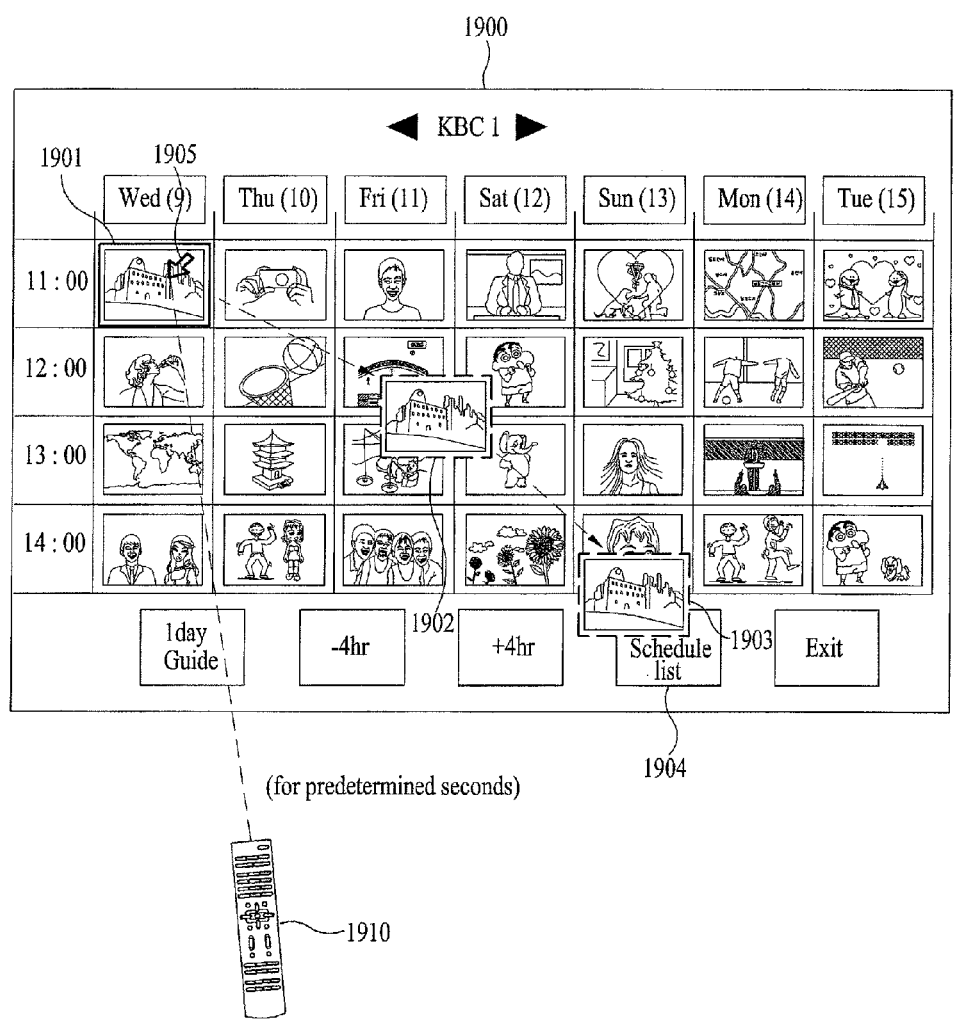
FIG. 19 is a display screen illustrating a second user interface to store a specific event, displayed on an enhanced EPG in accordance with an embodiment of the present invention, within a schedule list.

Next, FIG. 19 is a display screen illustrating a second user interface to store a specific event displayed on the enhanced EPG in accordance with an embodiment of the present invention within a schedule list. Differing from the user interfaces shown in FIGS. 17 and 18, the user interface shown in FIG. 19 minimizes user action.

As shown in FIG. 19, the arrow indicator 1905 of the remote controller 1910 is located at the region of a thumbnail image 1901 corresponding to a specific event for a designated time or more. The display apparatus 1900 automatically moves the position of the thumbnail image 1901 to a schedule list tab 1904 when the arrow indicator 1905 is located at the region of the thumbnail image 1901 for the designated time or more. As shown in FIG. 19, the position of the thumbnail image 1901 may be changed to other positions 1902 and 1903 in a regular direction or be automatically moved in other directions.

Figure 20:
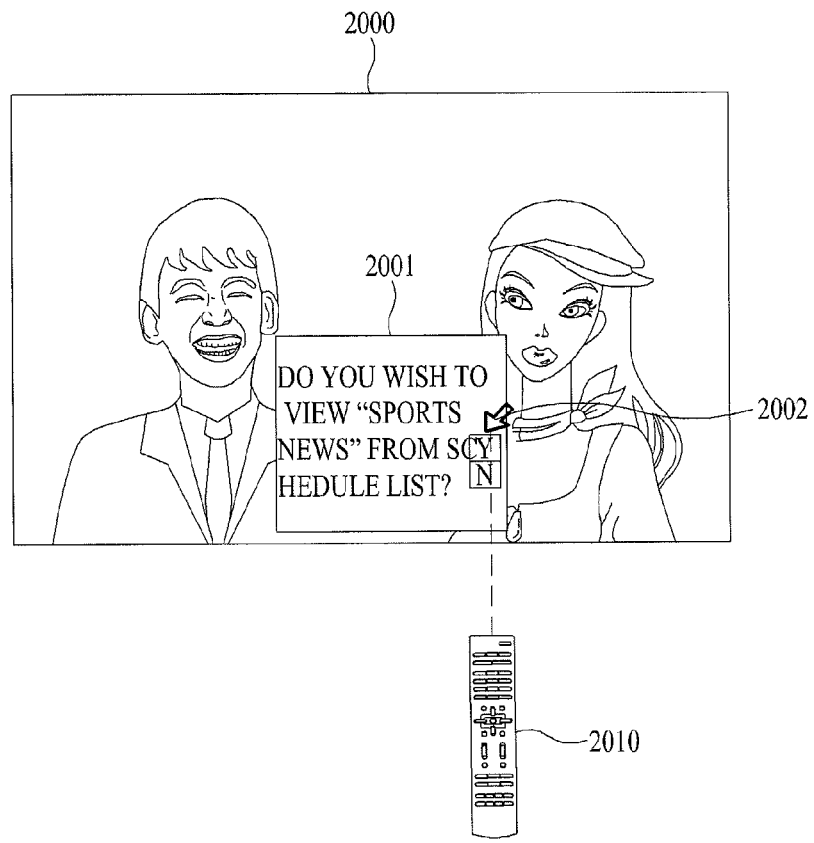
FIGS. 20 and 21 are display screens illustrating third user interfaces to process the specific event stored in the schedule list shown in FIGS. 17 to 19.
Figure 21:
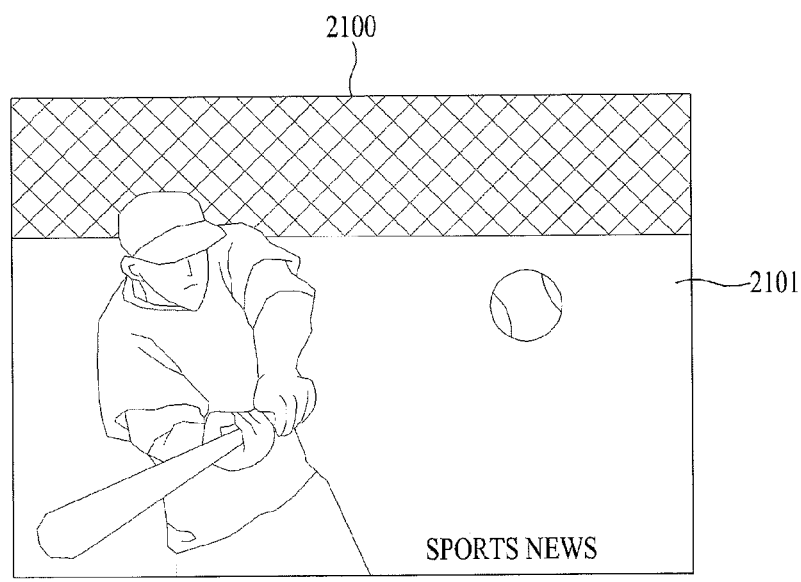

Next, FIGS. 20 and 21 are display screens illustrating a third user interface to process a specific event stored in the schedule list shown in FIGS. 17 to 19. Further, it is assumed that at least one event is stored in a schedule list using one of the user interfaces shown in FIGS. 17 to 19.

For example, the display apparatus 2000 in accordance with an embodiment of the present invention monitors whether the start time of each event stored in the schedule list has come while outputting a general broadcast program. When the start time of a specific event has come, an OSD generator of the display apparatus 2000 outputs a sub-OSD screen 2001 asking if the user wants to view the above specific event. Thereafter, when the user selects "YES" through the arrow indicator 2002 of the remote controller 2010, the display apparatus 2100 switches to a screen 2101 corresponding to the specific event as shown in FIG. 21.

Further, the display apparatuses 2000 and 2100 can automatically store the event, the start_time of which has come, in the memory when the display apparatuses 2000 and 2100 are in a stand-by state.

Figure 22:
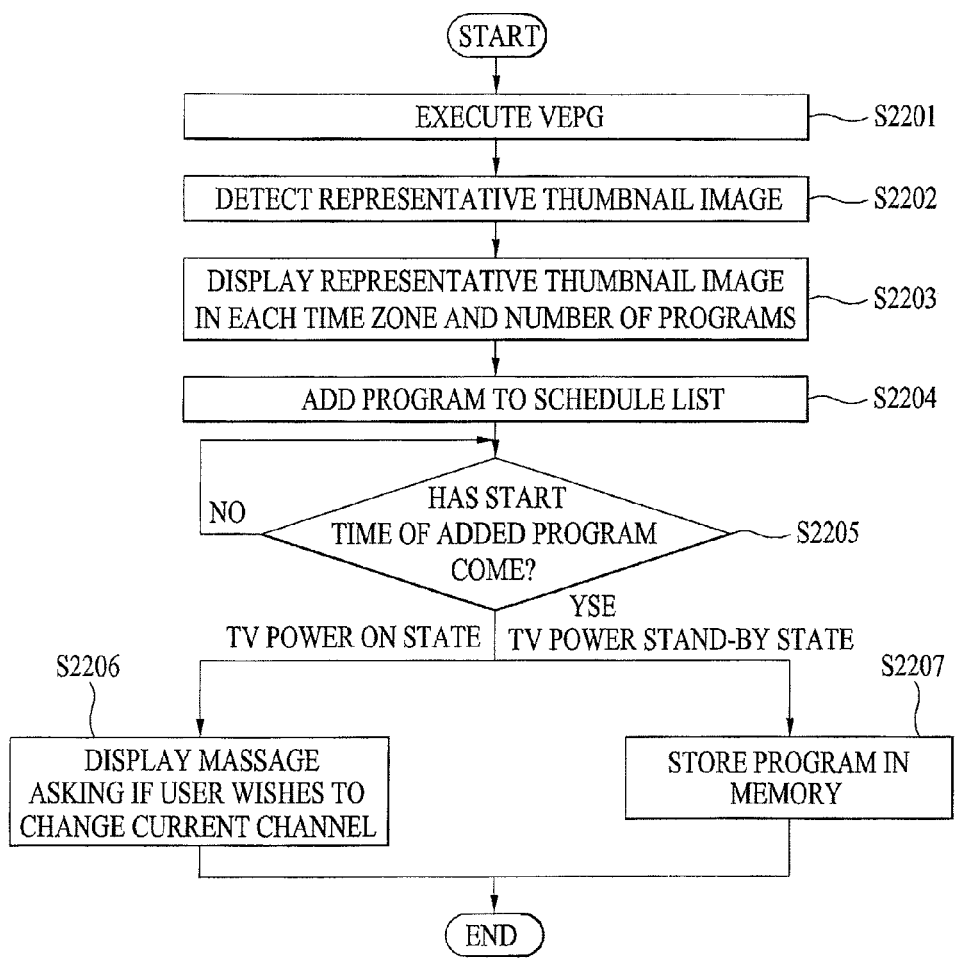
FIG. 22 is a flowchart illustrating a control method of processing an enhanced EPG in accordance with the embodiment of the present invention.

Next, FIG. 22 is a flowchart illustrating a control method of processing an enhanced EPG in accordance with an embodiment of the present invention. Further, the display apparatus for providing the enhanced EPG in accordance with one embodiment of the present invention receives AV data including audio data and video data through the path of a first network and receives information regarding at least one event provided from each channel and a thumbnail image corresponding to the event through the path of a second network.

Also, in accordance with one embodiment of the present invention, the first network and the second network are IP networks. Further, in accordance with another embodiment of the present invention, the first network corresponds to a broadcast network and the second network corresponds to an IP network. Also, the display apparatus can receive a broadcast signal through the broadcast network or through the IP network.

When the display apparatus receives a command signal to execute the enhanced EPG through the user interface, the display apparatus executes a VEPG operation (S2201). That is, the VEPG is a term corresponding to the above-described enhanced EPG. Thereafter, the display apparatus detects a representative event from at least one event belonging to a designated time zone (S2202).

The display apparatus also generates an enhanced EPG OSD including the thumbnail image corresponding to the detected representative event in the designated time zone, and displays the generated enhanced EPG OSD on a screen. In more detail, the display apparatus displays the representative thumbnail image in each time zone and the number of programs (events) belonging to each time zone in an overlaid form (S2203). See also FIGS. 15 and 16.

In accordance with another embodiment, operation S2202 includes calculating time-based shares of the respective events belonging to the designated time zone, and regarding an event having the highest time-based share as a representative event based on a result of the calculation. In accordance with yet another embodiment, operation S2202 includes detecting access histories of the respective events belonging to the designated time zone, and regarding an event having the highest access priority as a representative event based on the detected access histories. The access history includes, for example, at least one of the number of access attempts to each event and the total display time of each event.

In accordance with still another embodiment, in operation S2203, the display apparatus displays an OSD including a main region which displays the thumbnail image corresponding to the representative event and a sub-region which guides the number of events belonging to the designated time zone.

Further, in order to execute reserved viewing or reserved recording, the display apparatus selects at least one thumbnail image with reference to the enhanced EPG OSD displayed on the screen and adds an event corresponding to the selected thumbnail image to the schedule list (S2204). Also, additional information of the event corresponding to the selected thumbnail image is stored in the memory. The additional information of the event includes, for example, information regarding a start time of the event defined by the event information table (EIT).

Thereafter, the display apparatus judges whether or not the start time of the event added to the schedule list has come (S2205). Upon judging that the start time of the event has come (Yes in S2205), two modes are selectively executed according to power states of the display apparatus (for example, a TV).

When the power of the TV is turned on, the display apparatus displays an OSD screen asking if the user if they want to change the current channel of the TV to a channel with the event, the start time of which has come (S2206). On the other hand, when the power of the TV is in the stand-by state, the event, the start time of which has come, is directly stored in the memory (S2207).

Thus, the user can freely select a channel based EPG screen or a day based EPG screen according to desired standards. Further, only the thumbnail image of a representative event having the top priority is preferably displayed on a restricted EPG screen, or all events in each time zone can be displayed on the EPG screen such that thumbnail images corresponding to all the events are spread in order of time. Further, indicators indicating the number of hidden events in respective time zones can be added to the enhanced EPG screen, thereby increasing user recognition. Also, a user interface allowing the user to more rapidly select events, reserve viewing and reserve recording of programs is provided.

Although the respective drawings have been divisionally illustrated for convenience of illustration, the embodiments described in the respective drawings may be combined to implement additional embodiments. Further, designing of a recording medium readable by a computer, in which a program to implement the above-described embodiments is recorded as needed by those skilled in the art, is within the spirit and scope of the invention.

The configurations and methods of the above-described embodiments are not limitedly applied to the display apparatus and the operating method thereof in accordance with the present invention, and some or all of the respective embodiments may be selectively combined so as to achieve various modifications of the embodiments.

Further, the operating method of the display apparatus in accordance with one embodiment of the present invention may be implemented as a code readable by a processor of the display apparatus in a recording medium readable by the processor. Recording media readable by the processor may include all kinds of recording devices in which data readable by the processor is stored. The recording media readable by the processor may include a ROM, a RAM, a CD-ROM, a magnetic tape, a floppy disc and an optical data storage device, or may be implemented in a carrier wave form, such as transmission through Internet. Further, the recording media readable by the processor may be distributed to computer systems connected by a network, and a code readable by the processor in a distributed manner may be stored and executed in the recording media.

As is apparent from the above description, one embodiment of the present invention newly defines a data transmission protocol to generate an enhanced EPG.

Another embodiment of the present invention provides a solution to extract thumbnail images displayed on an enhanced EPG.

Yet another embodiment of the present invention provides a user interface to easily process a broadcast program display on an enhanced EPG.

It will be apparent to those skilled in the art that various modifications and variations can be made in the present invention without departing from the spirit and scope of the invention. Thus, it is intended that the present invention covers the modifications and variations of this invention provided they come within the scope of the appended claims and their equivalents.

Further, although both the product-invention and the process-invention are described herein, description thereof may be complementarily applied to each other.

What is claimed is:

1. A network device comprising:
   a tuner configured to receive audio and video data of at least one broadcast program;
   a network interface configured to receive at least one thumbnail image corresponding to each of the at least one broadcast program;
   a user interface configured to receive a first command for executing an electronic program guide from a remote controller; and
   a controller configured to output a signal for displaying the electronic program guide in response to the first command, wherein the electronic program guide comprises the at least one thumbnail image within a designated time zone,
   wherein the controller is further configured to output a signal for displaying a specific thumbnail image within both of first and second designated time zones if a broadcast time is overlapped with the both of first and second designated time zones, further a size of the specific thumbnail image displayed within the first designated time zone is same as that of the specific thumbnail image displayed within the second designated time zone.

2. The network device of claim 1, wherein the electronic program guide further comprises an indicator identifying the number of the at least one thumbnail image corresponding to each of the at least one broadcast program within the designated time zone.

3. The network device of claim 2, wherein the indicator is changeable according to the number of the at least one thumbnail image, further the indicator corresponds to the number (N) of all thumbnail images within the designated time zone or N−1.

4. The network device of claim 1, wherein the controller is further configured to output signal for displaying a schedule list tab for registering another specific broadcast program corresponding to another specific thumbnail image as a viewing scheduled broadcast program in a memory.

5. The network device of claim 4, wherein the memory stores time information of the another specific broadcast program corresponding to the another specific thumbnail image in response to a second command from the remote controller.

6. The network device of claim 4, wherein the controller is further configured to output signal for displaying a reminder message on the another specific broadcast program before the another specific broadcast program corresponding to the another specific thumbnail image starts.

7. The network device of claim 6, wherein the reminder message asks whether or not a user wants to view the viewing scheduled broadcast program, further the controller is configured to switch a screen corresponding to the viewing scheduled broadcast program.

8. The network device of claim 5, wherein an arrow indicator corresponding to the second command is movable within the electronic program guide depending on an input signal from a touch sensor or motion sensor of the remote controller.

9. The network device of claim 5, wherein the time information comprises at least one of start time of the another specific broadcast program.

10. The network device of claim 1, wherein the EPG comprises at least four designated time zones, further the EPG comprises a plurality of time zone options for changing the designated time zone.

11. The network device of claim 10, wherein the designated time zone is changed to indicate another broadcast programs for a next four or 24 hours in response to selecting a first time zone option among the plurality of time zone options by the remote controller, further the first time zone option is closer to a right side than a second time zone option within the electronic program guide.

12. The network device of claim 11, wherein the designated time zone is changed to indicate another broadcast programs for a previous four or 24 hours in response to selecting the second time zone option among the plurality of time zone options by the remote controller, further the second time zone option is closer to the left side than the first time zone option within the electronic program guide.

13. The network device of claim 4, wherein the memory stores the another specific broadcast program if the smart television is in a stand-by state at the another specific broadcast program's start time.

14. The network device of claim 3, wherein the electronic program guide further comprises an exit tab for returning to a former screen instead displaying the electronic program guide.

15. The network device of claim 13, wherein the controller is further configured to output signal for displaying a first tab for accessing to the electronic program guide having the thumbnail image and a second tab for accessing to another electronic program guide having no thumbnail image.

16. A method of controlling a network device, the method comprising:
   receiving audio and video data of at least one broadcast program, by a tuner;
   receiving at least one thumbnail image corresponding to each of the at least one broadcast program, by a network interface;
   receiving a first command for executing an electronic program guide from a remote controller, by a user interface; and
   outputting signal for displaying the electronic program guide in response to the first command, wherein the electronic program guide comprises the at least one thumbnail image within a designated time zone,
   wherein a specific thumbnail image is displayed within both of first and second designated time zones if a broadcast time is overlapped with the both of first and second designated time zones, further a size of the specific thumbnail image displayed within the first designated time zone is same as that of the specific thumbnail image displayed within the second designated time zone.

* * * * *